(12) United States Patent
Singh

(10) Patent No.: US 12,713,411 B2
(45) Date of Patent: Aug. 18, 2026

(54) RESOURCE ALLOCATION FOR CELLULAR AND DEVICE-TO-DEVICE COMMUNICATIONS

(71) Applicant: Telefonaktiebolaget LM Ericsson (PUBL), Stockholm (SE)

(72) Inventor: Bikramjit Singh, Raasepori (FI)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 358 days.

(21) Appl. No.: 18/257,194

(22) PCT Filed: Dec. 15, 2020

(86) PCT No.: PCT/EP2020/086299

§ 371 (c)(1),
(2) Date: Jun. 13, 2023

(87) PCT Pub. No.: WO2022/128074

PCT Pub. Date: Jun. 23, 2022

(65) Prior Publication Data

US 2024/0049201 A1 Feb. 8, 2024

(51) Int. Cl.
*H04W 72/0453* (2023.01)
*H04W 72/23* (2023.01)

(52) U.S. Cl.
CPC ....... *H04W 72/0453* (2013.01); *H04W 72/23* (2023.01)

(58) Field of Classification Search
CPC ............. H04W 72/0453; H04W 72/23; H04W 72/0446; H04W 76/14
See application file for complete search history.

(56) References Cited

U.S. PATENT DOCUMENTS

| | | | | |
|---|---|---|---|---|
| 11,765,696 B2 * | 9/2023 | Wu | .................... | H04L 5/0053 370/329 |
| 2017/0295601 A1 * | 10/2017 | Kim | .................... | H04W 72/20 |
| 2018/0352523 A1 | 12/2018 | Oy | | |
| 2020/0029318 A1 * | 1/2020 | Guo | .................... | H04W 76/11 |

FOREIGN PATENT DOCUMENTS

| | | |
|---|---|---|
| EP | 2 641 440 A0 | 9/2013 |
| EP | 3 609 267 A1 | 2/2020 |

OTHER PUBLICATIONS

ETSI TS 138 214 V16.2.0 (Jul. 2020); 5G; NR; Physical layer procedures for data (3GPP TS 38.214 version 16.2.0 Release 16).

(Continued)

*Primary Examiner* — Dady Chery
(74) *Attorney, Agent, or Firm* — Baker Botts L.L.P.

(57) ABSTRACT

There is provided a method performed by a wireless device. The method comprises receiving, from a network node, an assignment of preconfigured resources useable by the wireless device for both cellular and sidelink communication. The method further comprises communicating with the network node by cellular communication in a first set of resources within the assigned preconfigured resources; and communicating with a second wireless device by sidelink communication in a second set of resources within the assigned preconfigured resources.

18 Claims, 16 Drawing Sheets

(56) References Cited

OTHER PUBLICATIONS

Christian Guthy, Wolfgang Utschick "Low-Complexity Linear Zero-Forcing for the MIMO Broadcast Channel" IEEE Journal of Selected Topics in Signal Processing, vol. 3, No. 6, Dec. 2009.
Tarcisio F. Maciel and Anja Klein, "A convex quadratic SDMA grouping algorithm based on spatial correlation" 2007 IEEE.
3GPP TSG-RAN WG1 Meeting #97; Reno, USA, May 13-17, 2019; Agenda Item: 7.2.4.2.1; Source: Ericsson; Title: Feature lead summary #4 on Resource allocation for NR sidelink Mode 1 (R1-1907916 (Revision of R1-1907854)).
PCT Notification of Transmittal of the International Search Report and the Written Opinion of the International Searching Authority, or the Declaration issued for International application No. PCT/EP2020/086299—Nov. 8, 2021.

* cited by examiner

RESOURCE ALLOCATION FOR CELLULAR AND DEVICE-TO-DEVICE COMMUNICATIONS

PRIORITY

This nonprovisional application is a U.S. National Stage Filing under 35 U.S.C. § 371 of International Patent Application Serial No. PCT/EP2020/086299 filed Dec. 15, 2020 and entitled "RESOURCE ALLOCATION FOR CELLULAR AND DEVICE-TO-DEVICE COMMUNICATIONS," which is hereby incorporated by reference in its entirety.

TECHNICAL FIELD

The present disclosure relates to the assignment and allocation of preconfigured resources to both cellular and device-to-device communications.

BACKGROUND

In a cellular communication network, such as a network operating according to the protocols developed by the 3rd Generation Partnership Project ("3GPP"), a wireless device can communicate within resources scheduled by a network node. Two classes of scheduling resources are: i) dynamic scheduling and ii) configured grants ("CG") and semi-persistent scheduling ("SPS").

In dynamic scheduling, the resources used by the wireless device for transmission are not fixed, or preconfigured by the network, but instead are allocated dynamically, e.g. in response to a request by the wireless device. In both Long Term Evolution ("LTE") and New Radio ("NR", also referred to as "5G") networks, the overall approach of dynamic scheduling includes the wireless device sending a scheduling request ("SR") to the network node (e.g. an eNodeB or gNB) and, in response, receiving from the network node a resource grant. The network node can configure the size of the grant based on the quantity and/or priority of the data to be transmitted by the wireless device. In some cases, the network node might first allocate a relatively small grant in response to the SR to enable the wireless device to respond by transmitting a buffer status report ("BSR"). The network node can use the BSR to determine the size of the subsequent grant to allocate to the wireless device to enable the wireless device to transit its data.

In the case of configured grants and SPS, the wireless device is configured with periodic grants. Typically, configured grants refer to periodic uplink ("UL") grants (i.e., a grant of resources for uplink transmissions from the wireless device to the network node), and SPS refers to periodic downlink ("DL") grants (i.e. a grant of resources for receiving downlink transmissions from the network node).

In 3GPP Technical Specification ("TS") 38.321, some parameters for the configured grant (of Type1, where an uplink grant is provided by Radio Resource Control ("RRC")) are:

- cs-RNTI: Configured Scheduling Radio Network Temporary Identifier ("CS-RNTI") for a retransmission;
- periodicity: the periodicity of the configured grant Type 1;
- timeDomainOffset: Offset of a resource with respect to subframe number ("SFN")=0 in the time domain;
- timeDomainAllocation: Allocation of the configured uplink grant in the time domain which contains startSymbolAndLength (i.e. SLIV as specified in TS 38.214);
- nrofHARQ-Processes: the number of hybrid automatic repeat request ("HARQ") processes for the configured grant.

The HARQ protocol is used in 4G and 5G systems to provide fast re-transmissions on the Media Access Control ("MAC") layer. It is used both in UL and DL and can be configured through various parameters, e.g. the maximum number of re-transmissions, operating Block Error Rate ("BLER"), possible repetitions, etc. One way to implement the HARQ protocol is to use autonomous re-transmissions, i.e. the transmitter always performs a given number of HARQ retransmission attempts. Autonomous retransmissions are especially suitable in one-to-many or many-to-one communication scenarios since using HARQ feedback from many recipients or reliably transmitting HARQ feedback to many recipients can be complex. It has been found that, in practice, a suitable setting for the number of HARQ transmission attempts using autonomous re-transmissions enables most transmission errors can be recovered.

Configured grants can benefit from a short latency (if configured with a suitably short periodicity); however, they can lack the flexibility of dynamic grants since both transport block size ("TBS") and coding are fixed. Configured grants can also be wasteful with resources if utilization by the wireless devices low. These characteristics mean configured grants are typically useful for small transmissions that occur frequently with deterministic periodicity. In such cases, configured grants can give low latency with minimal control signaling and low PUSCH overhead. In cases where configured grant resources are not enough for the wireless device's data requirements, the wireless device can resort to dynamic scheduling by sending a BSR to the network node, which could then give a grant suiting the outstanding needs of the wireless device.

Sidelink transmissions were introduced in Rel. 16 of the NR specifications, and can be viewed as an enhancement to the Proximity-based Services ("ProSe") specified in the LTE specifications. Sidelink communication are device-to-device ("D2D") communications between wireless devices. A D2D communication is between two devices directly and does not pass via the network node. In certain circumstances, sidelink communications can benefit from lower latency than cellular communications (that is, communications via the network node).

SUMMARY

According to one aspect of the present disclosure there is provided a method performed by a wireless device. The method comprises receiving, from a network node, an assignment of preconfigured resources useable by the wireless device for both cellular and sidelink communication. The method can additionally comprise the steps of communicating with the network node by cellular communication in a first set of resources within the assigned preconfigured resources; and communicating with a second wireless device by sidelink communication in a second set of resources within the assigned preconfigured resources.

According to another aspect of the present disclosure there is provided a wireless device comprising transceiver circuitry and processing circuitry. The processing circuitry is configured to cause the wireless device to receive, from a network node via the transceiver circuitry, an assignment of preconfigured resources useable for both cellular and sidelink communication. The processing circuitry is further configured to cause the wireless device to communicate with the network node by cellular communication via the transceiver circuitry in a first set of resources within the assigned preconfigured resources; and communicate with a second wireless device by sidelink communication via the transceiver circuitry in a second set of resources within the assigned preconfigured resources.

According to another aspect of the present disclosure there is provided a computer program comprising instructions that, when executed by processing circuitry of a wireless device, cause the wireless device to perform a method. The method comprises receiving, from a network node, an assignment of preconfigured resources useable by the wireless device for both cellular and sidelink communication. The method can additionally comprise the steps of communicating with the network node by cellular communication in a first set of resources within the assigned preconfigured resources; and communicating with a second wireless device by sidelink communication in a second set of resources within the assigned preconfigured resources.

According to another aspect there is provided a non-transitory computer-readable storage medium comprising instructions that, when executed by processing circuitry of the wireless device, cause the wireless device to perform a method. The method comprises receiving, from a network node, an assignment of preconfigured resources useable by the wireless device for both cellular and sidelink communication. The method can additionally comprise the steps of communicating with the network node by cellular communication in a first set of resources within the assigned preconfigured resources; and communicating with a second wireless device by sidelink communication in a second set of resources within the assigned preconfigured resources.

According to another aspect of the present disclosure, there is provided a method performed by the network node. The method comprises providing to a first wireless device an assignment of preconfigured resources useable by the wireless device for both cellular and sidelink communication. The method can further comprise communicating with the first wireless device in a first set of resources within the assigned preconfigured resources distinct from a second set of resources within the preconfigured resources allocated to sidelink communications.

According to another aspect of the present disclosure there is provided a network node. The network node comprises processing circuitry and transceiver circuitry. The processing circuitry is configured to cause the network node to provide to a first wireless device an assignment of preconfigured resources useable by the wireless device for both cellular and sidelink communication. The processing circuitry is further configured to cause the network node to communicate with the first wireless device in a first set of resources within the assigned preconfigured resources distinct from a second set of resources within the preconfigured resources allocated to sidelink communications.

According to another aspect there is provided a computer program comprising instructions. The instructions, when executed by processing circuitry of the network node, cause the network node to provide to a first wireless device an assignment of preconfigured resources useable by the wireless device for both cellular and sidelink communication. The instructions, when executed, further cause the network node to communicate with the first wireless device in a first set of resources within the assigned preconfigured resources distinct from a second set of resources within the preconfigured resources allocated to sidelink communications.

According to another aspect there is provided a non-transitory computer-readable storage medium having stored thereon instructions. The instructions, when executed by processing circuitry of a network node, cause the network node to provide to a first wireless device an assignment of preconfigured resources useable by the wireless device for both cellular and sidelink communication. The instructions, when executed by processing circuitry of a network node, further cause the network node to communicate with the first wireless device in a first set of resources within the assigned preconfigured resources distinct from a second set of resources within the preconfigured resources allocated to sidelink communications.

BRIEF DESCRIPTION OF THE DRAWINGS

The invention may best be understood by referring to the following description and accompanying drawings that are used to illustrate particular embodiments of the invention. In the drawings.

DETAILED DESCRIPTION

According to current technical specifications, a given assignment of preconfigured resources to a wireless device—e.g. an assignment of periodic time-domain resources—can be used either only for cellular communications or only for D2D communications. Whilst both cellular and D2D communications can provide technical benefits when deployed in certain circumstances, it has been appreciated that limiting the allocation of resources within a grant to a single type of communication can in some situations lack flexibility and impose limitations on the reliability and latency gains that can be achieved. For example, if two wireless devices move out of D2D communication range from each other, it's no longer desirable to have resources allocated to D2D communication. In another example, D2D communications might be possible, but resources are allocated to communications over the cellular link, which might be subjected to higher latency and/or poor network conditions.

The present disclosure addresses these shortcomings by assigning to a wireless device preconfigured resources that can be used by the wireless device for both cellular and D2D communications. By being able to allocate these assigned resources to both cellular and D2D communication, reduced latency for transmission, and higher reliability due to the diversity arising from multiple transmission paths can be achieved. These and other advantages will be set out in more detail below with the described embodiments.

Embodiments of the present disclosure will now be described more fully with reference to the accompanying drawings. Other embodiments, however, are contained within the scope of subject matter disclosed herein. The disclosed subject matter should not be construed as limited only to the embodiments set forth herein; rather, these embodiments are provided by way of example to convey the scope of the subject matter to those skilled in the art.

Figure 1:
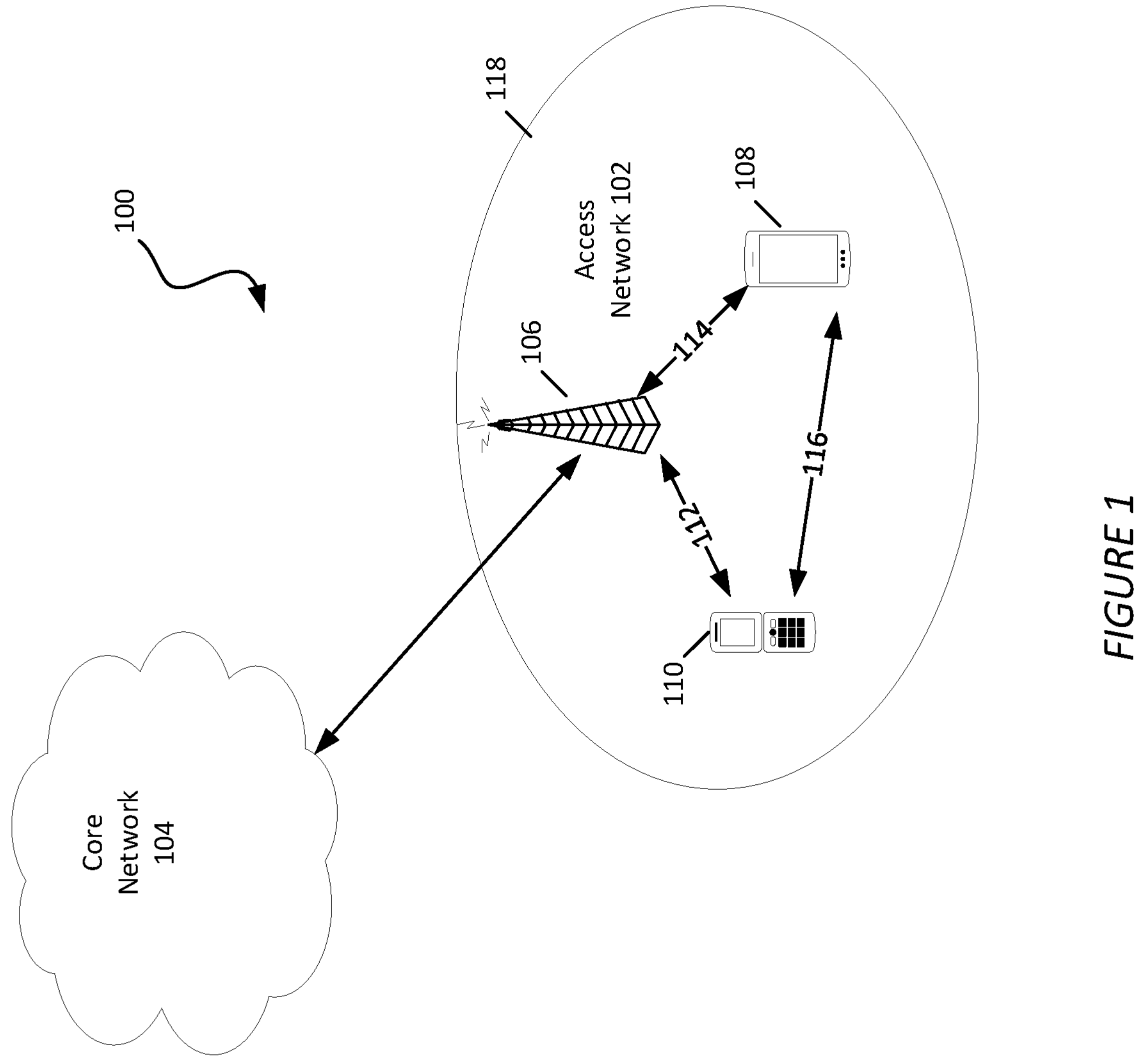
FIG. 1 illustrates a communication network.

FIG. 1 shows an example of a communication network 100. The communication network 100 includes an access network 102 connected to a core network 104. For simplicity, additional potential elements suitable for supporting communication between wireless devices, or a wireless device and another communication device, such as a landline telephone, service provider or any other network node or end device, have been omitted.

Access network 102 comprises network node 106 that defines a coverage area 118. Though only a single network node is shown in FIG. 1 for simplicity, it will be appreciated that in, in practice, an access network may comprise multiple network nodes each providing a corresponding coverage area. Network node 106 is connected to the core network 102 by a wired and/or wireless connection. The term "network node" refers to equipment capable, configured, arranged and/or operable to communicate directly or indirectly with a wireless device and/or with other network nodes (not shown) to provide wireless access to the wireless device and/or to perform other functions within the network. Examples of network nodes include, but are not limited to access points ("APs") (e.g. radio access points) and base stations ("BSs") (e.g. radio base stations, Node Bs, evolved Node Bs ("eNBs") or NR Node Bs ("gNBs")). A base station may be a relay node or a relay donor node controlling a relay. Base stations might be categorized based on the amount of coverage they provide (or, stated differently, their transmit power level), and for example be referred to as femto base stations, pico base stations, micro base stations or macro base stations.

Also shown are two wireless device 108 and 110, both shown located within the coverage area of network node 106. As used herein, a wireless device refers to a device capable, configured, arranged and/or operable to communicate wirelessly with network nodes and/or other wireless devices. Communicating wirelessly may involve transmitting and/or receiving wireless signals using electromagnetic waves, such as radio waves, infrared waves, and/or other types of signals suitable for conveying information through air. A wireless device may, in some contexts, be referred to as a user equipment ("UE"). Examples of a wireless device include, but are not limited to, a smart phone, a mobile phone, a cell phone, a voice over IP ("VoIP") phone, a wireless local loop phone, a desktop computer, a personal digital assistant ("PDA"), a wireless cameras, a gaming console or device, a music storage device, a playback appliance, a wearable terminal device, a wireless endpoint, a mobile station, a tablet, a laptop, a laptop-embedded equipment ("LEE"), a laptop-mounted equipment ("LME"), a smart device, a wireless customer-premise equipment ("CPE"), a vehicle-mounted wireless terminal device, etc. In an Internet of Things ("IoT") scenario, a wireless device may represent a machine or other device that performs monitoring and/or measurements and transmits the results of such monitoring and/or measurements to another wireless device and/or a network node. The wireless device may in this case be a machine-to-machine ("M2M") device, which may in a 3GPP context be referred to as an machine-type communication ("MTC") device. As one particular example, the wireless device may be a UE implementing the 3GPP narrow band internet of things ("NB-IoT") standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

Both wireless devices 108 and 110 are shown having a wireless connection to the network node 106, with numerals 112 and 114 denoting the respective wireless communication links. The connection between a wireless device and network node may also be referred to as a cellular connection, or cellular communication link. In this example, wireless devices 108 and 110 are also able to communicate through device-to-device ("D2D") communication, with the D2D communication link shown at 116. A D2D communication is, in this context, a direct communication between the two wireless devices 108 and 110 that does not traverse the network node 106 (or core network 102). Examples of D2D communications include: proximity-based services ("ProSe") communication (for LTE), sidelink ("SL") communication (for NR), vehicle-to-vehicle ("V2V"), vehicle-to-infrastructure ("V2I") or vehicle-to-everything ("V2X").

Figure 3:
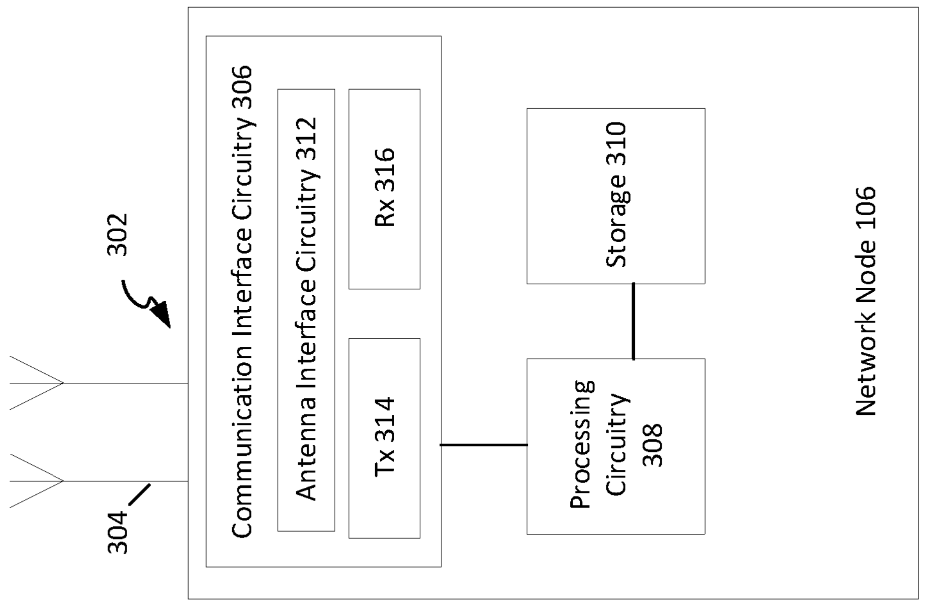
FIG. 3 illustrates exemplary component parts of a network node forming part of the communication network in FIG. 1.
Figure 2:
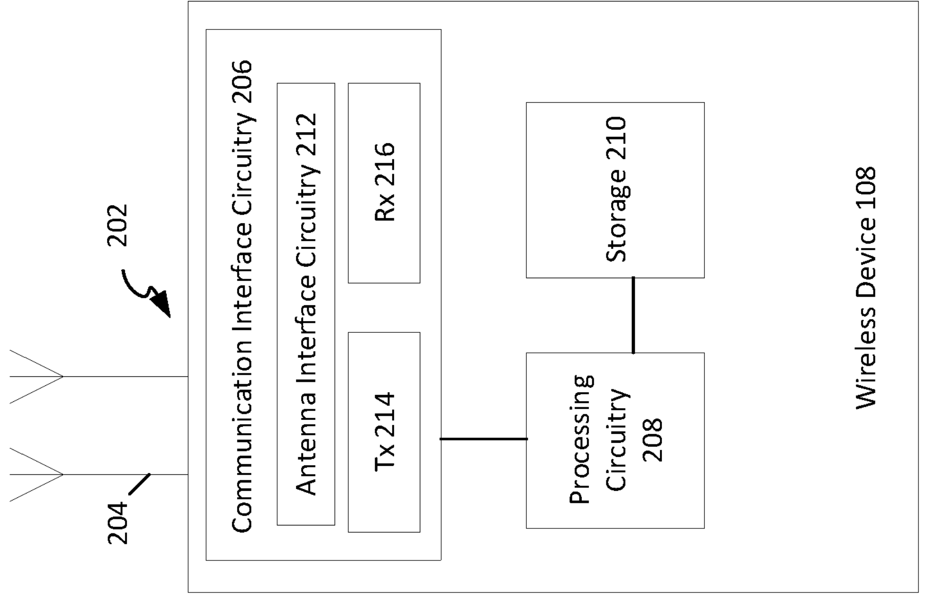
FIG. 2 illustrates exemplary component parts of a wireless device forming part of the communication network in FIG. 1.

FIGS. 2 and 3 show in more detail the wireless device 108 and network node 106 respectively.

Referring first to FIG. 2, the wireless device 108 is shown including transceiver circuitry 202, processing circuitry 208 and storage 210. The transceiver circuitry 202 comprises a plurality of antennas 204 and communication interface circuitry 206. Though two antennas are shown in FIG. 2 for the purposes of illustration, it will be appreciated that in other implementations the wireless device 108 may have a single antenna or more than two antennas. The antennas are coupled to communication interface circuitry 206, which comprises antenna interface circuitry 212, transmitter circuitry ("TX") 214 and receiver circuitry ("RX") 216.

The transceiver circuitry operates to transmit and receive information to the network node 106 and/or wireless device 110 according to one or more communications protocols and/or radio access technologies ("RATs"), such as LTE or NR. In more detail, the TX/RX circuitry 214/216 comprises radio frequency circuitry coupled through the antenna interface circuitry 212 to the one or more antennas 204, or antenna elements, for transmission and/or reception of signals. In this manner, the communication interface circuitry 206 can support one or more RAT air interfaces for operatively connecting to the network node and/or other wireless devices according to the relevant air interfaces.

The processing circuitry 208 comprises fixed circuitry, or pre-programmed circuitry, or programmable circuitry, or any combination of fixed, pre-programmed, and programmable circuitry. Non-limiting examples include one or more central processing units ("CPUs"), microprocessors, microcontrollers, Digital Signal Processors (DSPs), Field Programmable Gate Arrays (FPGAs), Complex Programmable Logic Devices (CPLDs), Application Specific Integrated Circuits (ASICS), or essentially any other arrangement of digital processing circuitry, such as combinational digital logic, sequential digital logic, or both.

In at least one example, the processing circuitry 208 comprises one or more processors—e.g., microprocessors—that are specially adapted to cause the wireless device 108 to perform the operations described herein (including those described with reference to FIG. 8) based on executing computer program instructions from one or more computer programs stored in a computer-readable medium providing non-transitory storage for the computer program(s). "Non-transitory" does not necessarily mean unchanging but does connote at least some temporal persistence, and various types of computer-readable media may be involved, such as a mix of non-volatile memory for long-term storage of the computer program(s) and volatile memory as working memory for program execution and scratch data.

Correspondingly, in one or more embodiments, the storage 210 stores one or more computer programs comprising computer program instructions, the execution of which by one or more processors yields the required configuration of the processing circuitry 208.

It will be appreciated that, although not shown in additional detail, wireless device 210 may include a similar structure to device 208 as shown in FIG. 2.

Turning now to FIG. 3, the network node 106 is shown including transceiver circuitry 302, processing circuitry 308 and storage 310. The transceiver circuitry 302 comprises a plurality of antennas 304 and communication interface circuitry 306. Though two antennas are shown in FIG. 3 for the purposes of illustration, it will be appreciated that in other implementations the network node 106 may have a single antenna or more than two antennas. The antennas are coupled to communication interface circuitry 306, which comprises antenna interface circuitry 312, transmitter circuitry ("TX") 314 and receiver circuitry ("RX") 316.

The transceiver circuitry operates to transmit and receive information to the wireless devices 108 and/or 110 according to one or more communications protocols and/or radio access technologies ("RATs"), such as LTE or NR. In more detail, the TX/RX circuitry 314/316 comprises radio frequency circuitry coupled through the antenna interface circuitry 312 to the one or more antennas 304, or antenna elements, for transmission of downlink signals and/or reception of uplink signals. In this manner, the communication interface circuitry 306 can support one or more RAT air interfaces for operatively connecting to the wireless devices and/or other network nodes according to the relevant air interfaces.

The processing circuitry 308 comprises fixed circuitry, or pre-programmed circuitry, or programmable circuitry, or any combination of fixed, pre-programmed, and programmable circuitry. Non-limiting examples include one or more central processing units ("CPUs"), microprocessors, microcontrollers, Digital Signal Processors (DSPs), Field Programmable Gate Arrays (FPGAs), Complex Programmable Logic Devices (CPLDs), Application Specific Integrated Circuits (ASICS), or essentially any other arrangement of digital processing circuitry, such as combinational digital logic, sequential digital logic, or both.

In at least one example, the processing circuitry 308 comprises one or more processors—e.g., microprocessors—that are specially adapted to cause the network node 106 to perform the relevant operations described herein based on executing computer program instructions from one or more computer programs stored in a computer-readable medium providing non-transitory storage for the computer program(s). "Non-transitory" does not necessarily mean unchanging but does connote at least some temporal persistence, and various types of computer-readable media may be involved, such as a mix of non-volatile memory for long-term storage of the computer program(s) and volatile memory as working memory for program execution and scratch data.

Correspondingly, in one or more embodiments, the storage 310 stores one or more computer programs comprising computer program instructions, the execution of which by one or more processors yields the required configuration of the processing circuitry 308.

Now that an overview of communication network 100 has been provided, approaches for assigning communication resources to a wireless device for use in cellular and D2D communications within communication network 100 will be described. In the following description, the communication network 100 will be described in the context of NR RAT, with corresponding NR nomenclature used as appropriate. This is for the purpose of illustration, and it will be appreciated that the following disclosure could equally be implemented within networks adopting a different RAT, for example LTE.

When operating according to the NR, or 5G, RAT, the network node 106 can be referred to as a gNB, and wireless devices 106 and 108 as UEs. Cellular communications between the UEs 106 and/or 108 and the gNB may refer to uplink communications from the UE to gNB, or downlink communications from the gNB to UE, as appropriate. Examples of uplink communications include physical uplink control channel ("PUCCH") transmissions and/or physical uplink shared channel ("PUSCH") transmissions. Examples of downlink transmissions include physical downlink control channel ("PDCCH") or physical downlink shared channel ("PDSCH") transmissions D2D communications between UEs 106 and 108 over link 116 may refer to sidelink ("SL") transmissions, as introduced in Rel. 16 of the 3GPP NR specifications. These are enhancements of the ProSe specified for LTE.

Unicast and groupcast transmissions are supported in NR sidelink. For unicast and groupcast, the physical sidelink feedback channel ("PSFCH") is introduced for a receiving UE to reply the decoding status to a transmitting UE.

Grant-free transmissions, which are adopted in NR uplink transmissions, are also provided in NR sidelink transmissions, to improve the latency performance.

To alleviate resource collisions among different sidelink transmissions launched by different UEs, channel sensing and resource selection procedures have been enhanced, which also lead to a new design of physical sidelink shared channel ("PSCCH").

To achieve a high connection density, congestion control and thus quality of service ("QoS") management is supported in NR sidelink transmissions.

To support these features, the following physical channels and reference signals have been introduced:

- Physical Sidelink Shared Channel ("PSSCH"). The PSSCH is transmitted by a sidelink transmitting UE, which conveys sidelink transmission data, system information blocks ("SIB s") for radio resource control ("RRC") configuration, and a part of the sidelink control information (SCI). The PSSCH may be viewed as the SL equivalent of the PDSCH.
- Physical Sidelink Feedback Channel ("PSFCH"). The PSFCH is transmitted by a sidelink receiving UE for unicast and groupcast, which conveys 1 bit information over 1 resource block ("RB") for the HARQ acknowledgement ("ACK") and the negative ACK ("NACK"). In addition, channel state information ("CSI") is carried in the medium access control ("MAC") control element ("CE") over the PSSCH instead of the PSFCH.
- Physical Sidelink Common Control Channel ("PSCCH"): When the traffic to be sent to a receiving UE arrives at a transmitting UE, a transmitting UE should first send the PSCCH, which conveys a part of Sidelink Control Information ("SCI") (which may be viewed as the SL version of downlink control information ("DCI")) to be decoded by any UE for the channel sensing purpose, including the reserved time-frequency resources for transmissions, demodulation reference signal ("DMRS") pattern and antenna port, etc. The PSCCH may be viewed as the SL version of PDCCH.
- Sidelink Primary/Secondary Synchronization Signal ("SPSS"/"SSSS"). Similar to downlink transmissions in NR, in sidelink transmissions, primary and secondary synchronization signals (called SPSS and SSSS, respectively) are supported. Through detecting the SPSS and SSSS, a UE is able to identify the sidelink synchronization identity ("SSID") from the UE sending the SPSS/SSSS. Through detecting the SPSS/SSSS, a UE is therefore able to know the characteristics of the UE transmitting the SPSS/SSSS. A series of process of acquiring timing and frequency synchronization together with SSIDs of UEs is called initial cell search. Note that the UE sending the SPSS/SSSS may not be necessarily involved in sidelink transmissions, and a node (UE/eNB/gNB) sending the SPSS/SSSS is called a synchronization source.
- Physical Sidelink Broadcast Channel ("PSBCH"). The PSBCH is transmitted along with the SPSS/SSSS as a synchronization signal/PSBCH block (SSB). The SSB has the same numerology as PSCCH/PSSCH on that carrier, and an SSB should be transmitted within the bandwidth of the configured BWP. The PSBCH conveys information related to synchronization, such as the direct frame number (DFN), indication of the slot and symbol level time resources for sidelink transmissions, in-coverage indicator, etc. The SSB is transmitted periodically at every 160 ms.
- DMRS, phase tracking reference signal ("PT-RS"), channel state information reference signal ("CSIRS"). These physical reference signals supported by NR downlink/uplink transmissions are also adopted by sidelink transmissions.
- Sidelink Control Information ("SCI"). The SCI is formed of two stages. A first part of the SCI is used for channel sensing purposes (including the reserved time-frequency resources for transmissions, demodulation reference signal ("DMRS") pattern and antenna port, etc. and can be read by all UEs, while the remaining (second stage) scheduling and control information such as an 8-bit source identity ("ID") and a 16-bits destination ID, new data indicator ("NDI"), redundancy value ("RV") and HARQ process ID is sent on the PSSCH to be decoded only by the receiving UE.

Similarly to PRoSE in LTE, NR sidelink transmissions have the following two modes of resource allocations:

- Mode 1: Sidelink resources are scheduled by a gNB.
- Mode 2: The UE autonomously selects sidelink resources from a (pre-)configured sidelink resource pool(s) based on the channel sensing mechanism.

For the in-coverage UE (that is, a UE within the coverage area of the gNB), a gNB can be configured to adopt Mode 1 or Mode 2. For the out-of-coverage UE, only Mode 2 can be adopted.

As in LTE, scheduling over the sidelink in NR is done in different ways for Mode 1 and Mode 2.

Mode 1 supports the following two kinds of grants:

- Dynamic grant: When the traffic to be sent over sidelink arrives at a transmitting UE (i.e. the UE transmitting the traffic over SL), this UE should launch a four-message exchange procedure to request sidelink resources from a gNB ((1) SR on UL, (2) grant, (3) BSR on UL, (4) grant for data on SL sent to UE). During the resource request procedure, a gNB may allocate a sidelink radio network temporary identifier ("SL-RNTI") to the transmitting UE. If this sidelink resource request is granted by a gNB, then a gNB indicates the resource allocation for the PSCCH and the PSSCH in the downlink control information (DCI) conveyed by PDCCH with cyclic redundancy check ("CRC") scrambled with the SL-RNTI. When a transmitting UE receives such a DCI, a transmitting UE can obtain the grant only if the scrambled CRC of DCI can be successfully solved by the assigned SL-RNTI. A transmitting UE then indicates the time-frequency resources and the transmission scheme of the allocated PSSCH in the PSCCH, and launches the PSCCH and the PSSCH on the allocated resources for sidelink transmissions. When a grant is obtained from a gNB, a transmitting UE can only transmit a single transport block ("TB"). As a result, this kind of grant may be suitable for traffic with more relaxed latency requirements.
- Configured grant: For traffic with stricter latency requirements, performing the four-message exchange procedure to request sidelink resources may cause unacceptable latency. In this case, prior to the traffic arrival, a transmitting UE may perform the four-message exchange procedure and request a set of resources. If a grant can be obtained from a gNB, then the requested resources are reserved in a periodic manner. Upon traffic arriving at a transmitting UE, this UE can launch the PSCCH and the PSSCH on the upcoming resource occasion. This kind of grant is also known as grant-free transmissions.

In both dynamic grant and configured grant, a sidelink receiving UE cannot receive the DCI (since it is addressed to the transmitting UE), and therefore a receiving UE should perform blind decoding to identify the presence of PSCCH and find the resources for the PSSCH through the SCI.

When a transmitting UE launches the PSCCH, CRC is also inserted in the SCI without any scrambling.

In Mode 2 resource allocation, when traffic arrives at a transmitting UE, this transmitting UE should autonomously select resources for the PSCCH and the PSSCH. To further minimize the latency of the feedback HARQ ACK/NACK transmissions and subsequently retransmissions, a transmitting UE may also reserve resources for PSCCH/PSSCH for retransmissions. To further enhance the probability of successful TB decoding at one shot and thus reduce the probability of performing retransmissions, a transmitting UE may repeat the TB transmission along with the initial TB transmission. This mechanism is also known as blind retransmission. As a result, when traffic arrives at a transmitting UE, then this transmitting UE should select resources for the following transmissions:

1) The PSSCH associated with the PSCCH for initial transmission and blind retransmissions.
2) The PSSCH associated with the PSCCH for retransmissions.

Figure 4:
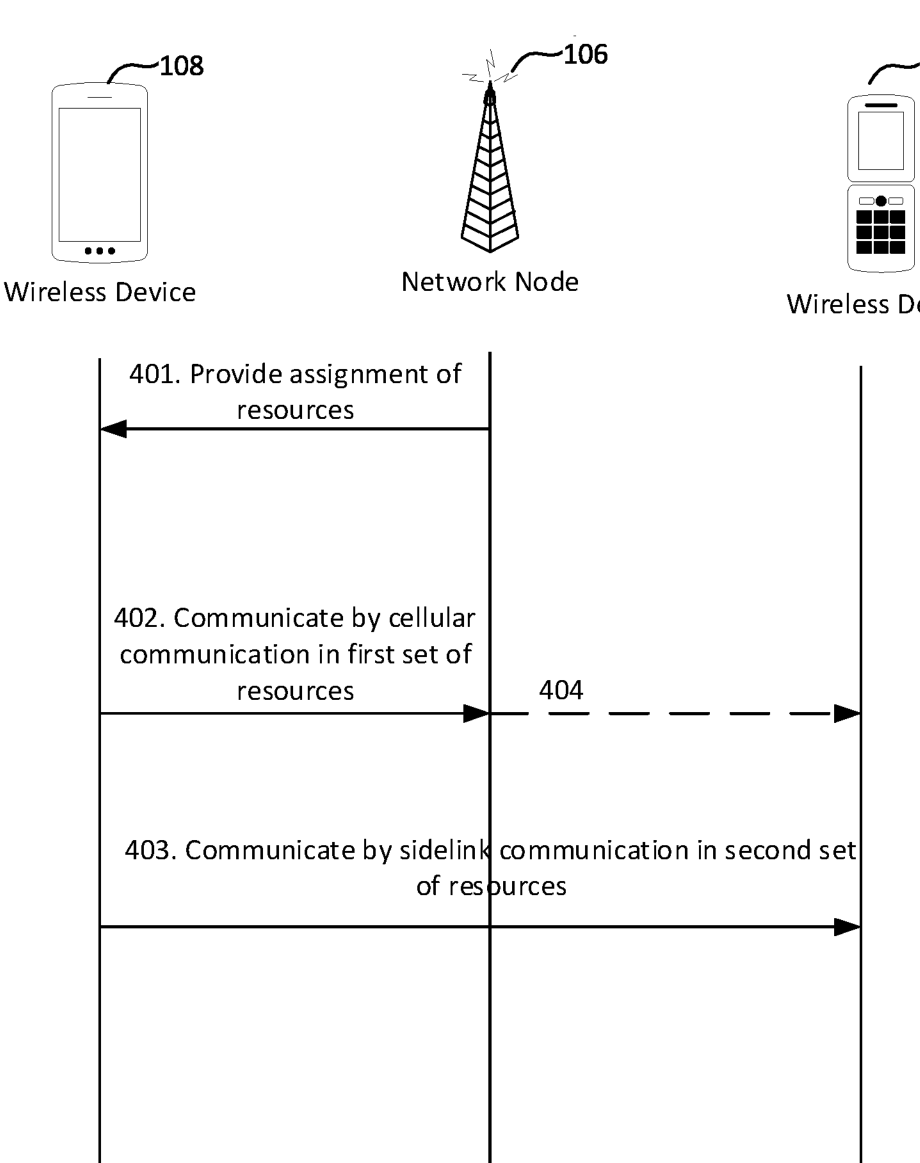
FIG. 4 is a signaling diagram illustrating communication according to embodiments of the present disclosure.

FIG. 4 is a signaling diagram illustrating a message sequence for assigning communication resources to wireless device 108 according to embodiments of the present disclosure.

At step 401, the network node 106 provides to wireless device 108 an assignment of resources. In this example, wireless device 108 is a UE and network node 106 a gNB. The assigned resources are a pattern of multiple resources. The resources may be preconfigured resources—that is, resources allocated to the wireless device 108 without the wireless device sending corresponding scheduling requests, or SRs. In other words, the preconfigured resources are not associated with a corresponding set of requests for resources sent by the wireless device 108. Instead, in some examples, the preconfigured resources are a pattern of multiple resources assigned to the wireless device 108 in response to a single request from the device. In other examples, the preconfigured resources are a pattern of multiple resources assigned to the wireless device 108 without any request from the wireless device 108. In both these sets of examples, the gNB 106 might send a single activation DCI to the wireless device 108 to activate the pattern of resources allocated to the device. Thus, the preconfigured resources might not be associated with corresponding DCI. Instead, there might be a single activation DCI for the pattern of multiple resources.

The preconfigured resources could be periodic resources (that is, resources occurring with a periodic pattern in time) or non-periodic resources (that is, resources occurring with a non-periodic or irregular pattern in time). The resources might be time-domain resources. The time-domain resources could take the form of a Configured Grant or Semi-persistent Scheduling resources. By having the preconfigured resources 'assigned' to it, the UE 108 has the periodic resources both configured by the gNB and, if appropriate, activated. In other words, having been assigned the resources, the UE 108 is able to communicate—i.e. transmit and/or receive—in those resources. The resources might be assigned to the UE 108 through higher layer signalling, such as RRC signaling.

As will be explained in more detail below with reference to various examples, the assigned preconfigured resources are usable by the UE 108 for both cellular and D2D communication. In these examples, the D2D communications are in the form of SL communications with UE 110. That is, in contrast to existing systems, the gNB 106 and UE 108 are configured to support the allocation of a single assignment of preconfigured multiple resources to both cellular and D2D communications. A 'single' assignment of resources may be an assignment of resources having a single ID. In other words, the assigned resources at step 401 are associated with a single ID.

Figure 5:
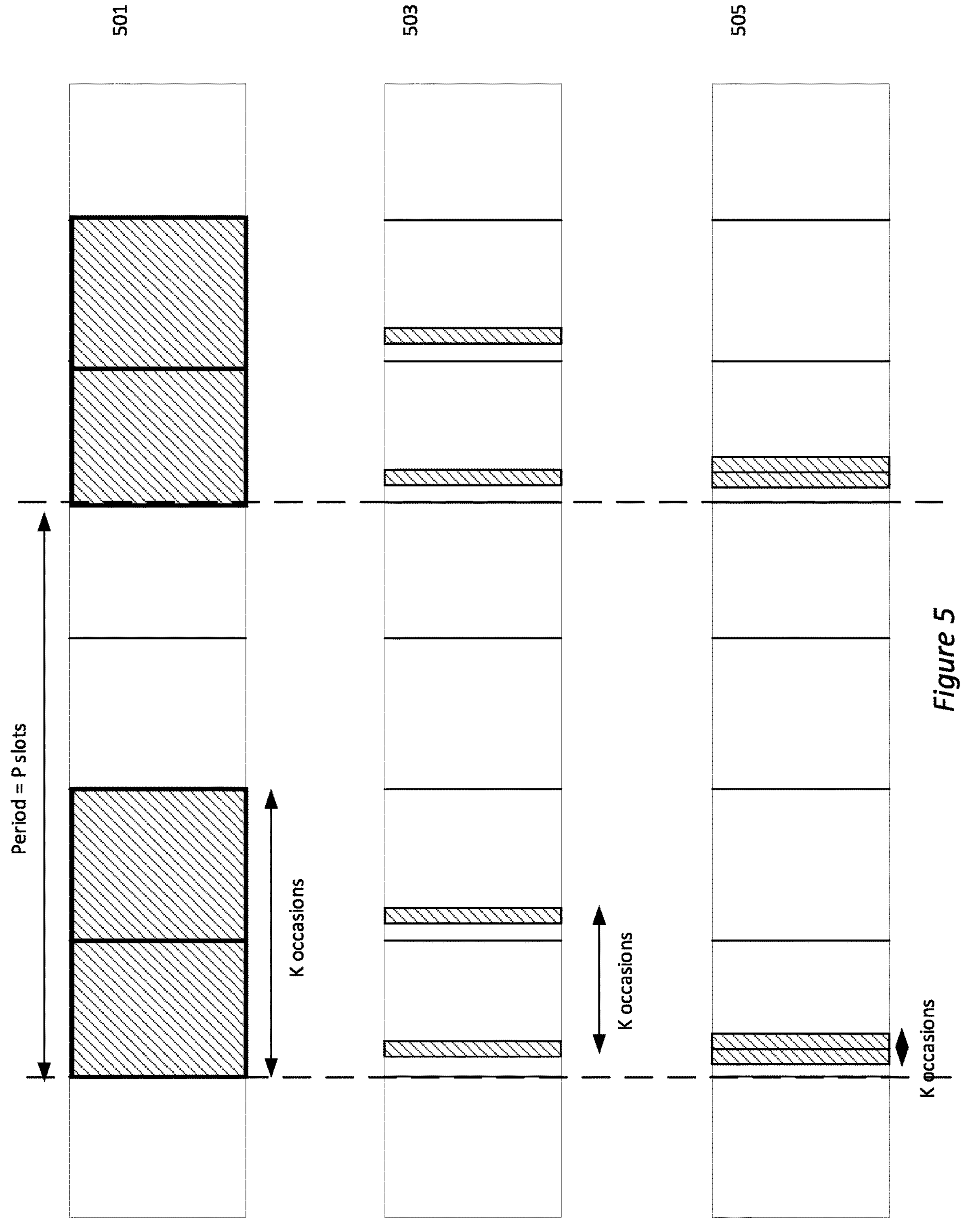
FIG. 5 illustrates exemplary resource repetition procedures for periodic time-domain resources.

Some examples of the format for the assigned preconfigured resources are shown in FIG. 5 at 501, 503 and 505. In this example, the preconfigured resources are periodic resources. In general, the assigned periodic resources have a configured periodicity and a group of one or more transmission occasions ("TOs") for each period. The periodicity refers to the period of time over which the pattern of assigned resources repeats. The periodicity may be expressed as a number of time units, where the time units could be symbols, mini-slots, slots, sub-frames, frames, etc., In each of the examples shown in FIG. 5, the periodicity is illustrated as a number, P, of slots.

As mentioned, each period includes a group of one or more transmission occasions. A transmission occasion refers to an allocation of time-domain resources for a transmission, either an UL transmission from the UE 108 to gNB 106, or a DL transmission from the gNB 106 to UE 108. The time-domain resources might be symbols, mini-slots, slots etc. As shown in FIG. 5, the temporal length of a given TO may vary by example, though it may be fixed within a given assignment of resources. In general, each period includes K occasions. K is an integer and can take values of one or more. In the examples shown in FIG. 5, K=2. When K is greater than one, the K occasions may be redundant allocations. This enables TB s to be transmitted repeatedly within a given period, which can improve transmission reliability. In this case, the occasions might be referred to as 'repetitions'.

Looking at FIG. 5 in more detail, 501 shows an example assignment of periodic resources in which the K occasions occur over consecutive slots within a period, and each occasions is the length of a slot—i.e., 14 symbols. This format can be referred to as slot aggregation. In this particular example, the periodic resources have a configured periodicity of P=4 slots and K=2 occasions per period.

In the periodic assignment illustrated at 503, the K occasions again occur over consecutive slots within a period. However, each occasion occupies a mini-slot, i.e. a period of time less than a full slot. Put another way, each TO occupies m consecutive symbols, where m<14. This format may be referred to as mini-slot aggregation. In the particular example shown, each occasion occupies 2 consecutive symbols (m=2). Thus, the TB size is 2 symbols. The periodicity is again P=4 slots.

In the periodic assignment illustrated at 505, the K TOs occur over consecutive time-domain resources, e.g. consecutive symbols, as in the arrangement shown at 501. That is, the K TOs are consecutive—in other words there is no time gap between the TOs within a given period. However, each TO occupies a period of time less than a slot duration, as in the arrangement shown at 503. In other words, there are K consecutive TOs within a given period, where each TO occupies m<14 consecutive symbols. In this particular example, m=2. The periodicity is again P=4 slots.

It will be appreciated that other arrangements of periodic resources are possible—FIG. 5 merely provides some examples for illustration.

Referring back to FIG. 4, at step 402 the UE 108 communicates by cellular communication with gNB 106 in a first set of resources within the assigned preconfigured resources, and at step 403 communicates with UE 110 by sidelink communication in a second set of resources within the assigned preconfigured resources. Thus, having received a single assignment of preconfigured resources—e.g., an assignment having a single ID—the UE 108 communicates over both a cellular link and a sidelink within those preconfigured resources. In some cases, discussed below, the cellular and sidelink communications are for the same UE 110. That is, the cellular communication is received at gNB 106 from UE 108 and is then transmitted in a DL transmission to UE 110 (shown at 404); and the sidelink communication is a transmission from UE 108 to UE 110. In other cases, the cellular and sidelink transmissions are for different UEs.

As will be evident from the examples discussed below, the numbering of steps 402 and 403 does not imply any temporal order for the communications—various arrangements are possible, some of which are illustrated in FIG. 6 and described below. As will also be explained in more detail, the allocation of the preconfigured resources to cellular and sidelink communications might be configured by the gNB or might be determined by the UE 108. In the latter case, the UE 108 receives the assignment of the preconfigured resources from the gNB 106, but then determines which of those resources to use for cellular communications and which to use for sidelink communications. The allocation of resources—that is, the division of the preconfigured resources between cellular and sidelink communications—may also change in time, that is, be switched. For example, UE 108 may receive from gNB 106 a first allocation of resources for a set of one or more periods, and then subsequently receive a second allocation of resources for a second set of one or more periods. The second set of periods may be subsequent in time to the first set of periods. The first and second sets of periods might temporally overlap (that is, resources may be allocated for a period and then a different allocation of resources for that period might be configured).

A cellular communication in the first set of resources could be an uplink transmission to the gNB (e.g. a transmission on PUSCH or PUCCH). Alternatively, it could be a downlink transmission from the gNB, that is, the UE receives a downlink transmission from the gNB in the first set of resources (e.g. a transmission on PDCCH or PDSCH).

The first and second sets of resources might be mutually exclusive resources. Expressed another way, the first set of resources might be distinct resources from the second set of resources. Thus, there might be no temporal overlap between resources of the first set and resources of the second set. The first set of resources might be located within a single period or multiple periods. The first set of resources might occupy, or span, a single transmission occasion ("TO") or might occupy, or span, multiple transmission occasions. In some arrangements, the first set of resources occupy TOs located within multiple periods. Similarly, the second set of resources might occupy, or span, a single TO or might occupy, or span, multiple TOs. In some arrangements, the second set of resources occupy TOs located within multiple periods.

Figures 6A, 6B:
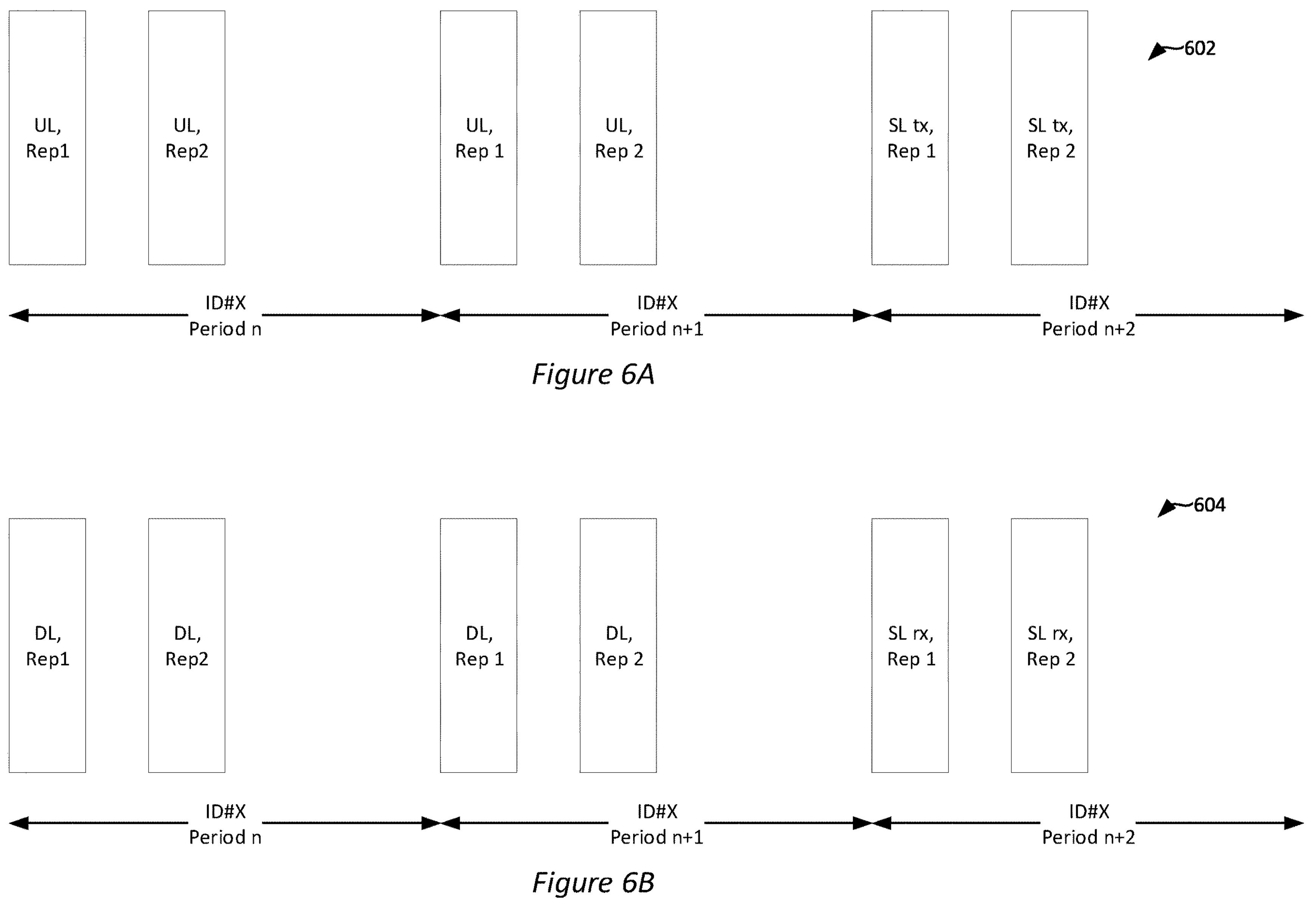
FIGS. 6A and 6B illustrate exemplary allocations of periodic resources according to embodiments of the present disclosure, in which resources within a given period can be allocated to cellular or sidelink communications.

FIGS. 6A and 6B illustrate example allocations of the preconfigured resources to cellular and sidelink communications. The preconfigured resources in this example are periodic resources. In these examples, the UE 108 performs both cellular and sidelink communications within the assigned resources, but performs either only cellular communication or only sidelink communication in the assigned resources within a given period. That is, the assigned resources—and so TOs—within a given period are used only for cellular communication or only for sidelink communication. In the event the allocation of the resources for cellular and sidelink communication is configured by the gNB 106, an alternative way of saying this is that the UE 108 is permitted to perform only cellular or only sidelink communications in the assigned resources per period. It is not permitted to perform both cellular and sidelink communications in the assigned resources within a period.

FIG. 6A shows a situation in which the cellular communications are uplink transmissions from the UE 108 to the gNB 106. Consequently, the periodic resources may be referred to as a Configured Grant. The assigned periodic resources are shown generally at 602, and have a configured periodicity and comprise two occasions (which in this example are repetitions) per period. The periodic resources are associated with the same ID, denoted 'ID #X'. In periods 'n' and 'n+1' the UE 108 performs an UL transmission over the cellular link within the repetitions of each period. However, in period 'n+2', the UE 108 performs a sidelink transmission to UE 110 in each repetition within that period. The UE 108 does not perform both cellular and sidelink transmissions in the repetitions of a single period.

FIG. 6B illustrates an analogous arrangement to FIG. 6A but where each cellular communication is a DL transmission from the gNB 106. Consequently, in this example the periodic resources might be referred to as SPS resources. The assigned periodic resources are denoted generally by 604. In periods 'n' and 'n+1', the UE 108 receives a DL transmission from gNB 106 over the cellular link within the occasions (which, again, in this example are repetitions) of those periods. In period 'n+2', the UE 108 transmits over the sidelink to UE 110 within the repetitions of that period.

FIGS. 6A and 6B therefore illustrate examples in which the first set of resources (allocated to cellular communications) comprise transmission occasions within one or more periods, and the second set of resources (allocated to sidelink communications) comprise transmission occasions within one or more different periods. In the specific example shown, the first set of resources comprise repetitions within periods 'n' and 'n+1', and the second set of resources comprise the repetitions within period 'n+2'.

Figures 7A, 7B:
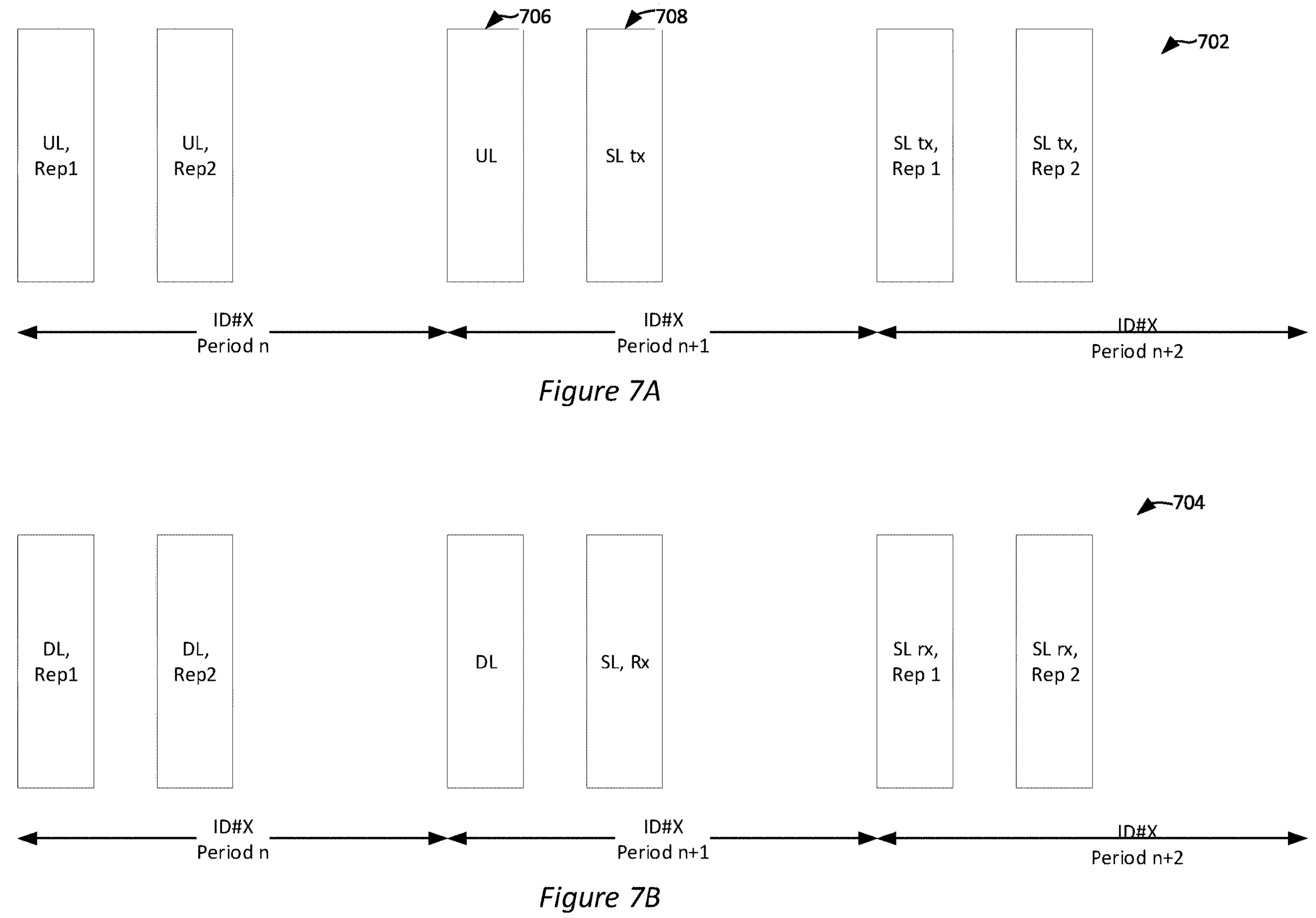
FIGS. 7A and 7B illustrate further exemplary allocations of periodic resources to according to embodiments of the present disclosure, in which resources within a given period can be allocated to both cellular and sidelink communications.

FIGS. 7A and 7B illustrate additional example allocations of periodic resources to cellular and sidelink communications. In these examples, the UE 108 can perform a combination of cellular and sidelink communications in the assigned resources within a given period (provided the assigned resources occupy at least two transmission occasions within a period). In other words, according to these examples, the assigned resources within a given period can be used for both cellular and sidelink transmissions.

FIG. 7A shows a situation in which the cellular communications are uplink transmissions from the UE 108 to the gNB 106. Consequently, the assigned periodic resources may be referred to as a Configured Grant. The assigned periodic resources are shown generally at 702, and have a configured periodicity and comprise two occasions per period. The periodic resources are associated with the same ID, denoted 'ID #X'. These resources are therefore part of the same assignment, or configuration. In period 'n' the UE 108 performs an UL transmission over the cellular link within the transmission occasions of that period. In period 'n+1', the UE 108 performs an uplink transmission in one transmission occasion of the period and a sidelink transmission to UE 110 in the other transmission occasion within that period. In period 'n+2', the UE 108 performs a sidelink transmission to UE 110 in both transmission occasions of the period.

FIG. 7B illustrates an analogous arrangement to FIG. 7A but where each cellular communication is a DL transmission from the gNB 106. Consequently, in this example the periodic resources might be referred to as SPS resources. The assigned periodic resources are denoted generally by 704. In period 'n' the UE 108 receives a DL transmission from gNB 106 over the cellular link within the occasions of those periods. In period 'n+1' the UE 108 receives a DL transmission from gNB 106 in one occasion of the period and performs a sidelink transmission to UE 110 in the other occasion of the period. In period 'n+2', the UE 108 transmits over the sidelink to UE 110 within both occasions of that period.

Expressed more generally, FIGS. 7A and 7B show examples where, for assigned preconfigured periodic resources having K occasions per period, the UE 108 performs in each period cellular communications (UL or DL) over N occasions and sidelink communications (e.g. transmissions) over Q occasions, where $N+Q \leq K$, $Q \geq 0$, and $N \geq 0$.

For periods in which the assigned periodic resources are used for both cellular and sidelink transmissions (e.g. period 'n+1' in FIG. 7A), several options exist for the communication of data to UE 110 from UE 108. One option is for the cellular 706 and sidelink 708 transmissions within a single period to communicate the same data, or information. In other words, the TB is replicated within the period across the cellular and sidelinks. For example, the cellular 706 and sidelink 708 transmissions within the period might be part of the same HARQ process and/or be for the same Packet Data Convergence Protocol ("PDCP") packet. Because the cellular and sidelink are different communication links, this approach can benefit from improved transmission reliability through transmission diversity. UE 110, on receiving the data over the cellular DL from gNB 106 and over the sidelink from UE 108, can combine the data after decoding to benefit from signal gain. The use of the same HARQ process ID can facilitate UE 110 determining the transmissions are for the same data. If different HARQ processes IDs are used for the cellular and sidelink transmissions (even though the same data is being transmitted), other approaches might be needed to enable UE 110 to determine the received transmissions over sidelink and DL relate to the same data. For example, UE 108 might include an identifier within the sidelink and cellular transmissions within the period that indicates the transmissions are for the same data.

A second option is for the cellular transmission 706 and sidelink transmission 708 within a single period to communicate different data, or information. In other words, a different TB is communicated from UE 108 over the cellular link and sidelink within a single period. For example, the cellular and sidelink transmissions within the period can relate to different HARQ processes (e.g. be associated with different HARQ process IDs) and/or be for different PDCP packets. This approach can benefit from reduced latency and improved network capacity.

In summary, FIGS. 7A and 7B illustrate examples in which the first set of resources (allocated to cellular communications) comprise one or more occasions within a period, and the second set of resources (allocated to sidelink communications) comprise one or more different occasions within the same period. In the specific example shown, the first set of resources comprise one occasion within period 'n+1', and the second set of resources comprise a different occasion within the same period 'n+1'.

It's noted that by allowing each transmission occasion within a period to be used for either cellular or sidelink communication, it's possible for some periods (e.g. period 'n' and 'n+2' in FIGS. 7A, 7B) to be dedicated to a single type of communication (either cellular or sidelink) and other periods to be used for both cellular and sidelink communications (e.g. period 'n+1' in FIGS. 7A and 7B). Put another way, in some examples the first set of resources comprises the transmission occasions within a first period (e.g. period 'n') and one or more transmission occasions within a second period (period 'n+1'), and the second set of resources comprises one or more different transmission occasions within the second period and the transmission occasions within a third period (period 'n+2').

It's noted that although FIGS. 6 and 7 show the periodic resources having two occasions per period, this is merely for illustration. In general, the periodic resources have a configured periodicity (e.g., P slots for some integer P) and a number K of occasions for each period, where $K \geq 1$. In some examples, $K \geq 2$. The periodic resources shown in FIGS. 6 and 7 could have any of the configurations shown in FIG. 5, or some other configuration.

It was mentioned above that the allocation, or division, of the preconfigured resources to cellular and sidelink transmissions (e.g. as illustrated in FIGS. 6 and 7) might be configured by gNB 106 or determined by UE 108. That is, the allocation of the preconfigured resources to the first and second sets might be configured by gNB 106 or determined by UE 108.

The division of the preconfigured resources between cellular and sidelink allocations can be configured by the gNB 106 in various ways. The allocation of the resources to cellular and sidelink communications might be preconfigured by gNB 106. UE 108 (and UE 110) might for example be configured through higher layer signaling, such as RRC signaling. Alternatively, the allocation of the preconfigured resources to cellular and sidelink communications might be configured through DCI transmitted to UE 108 and 110 on PDCCH. The indication of the resource allocation might be provided in a single DCI or multiple DCIs. For example, the allocation of the preconfigured resources to cellular communications might be provided to UE 108 through one DCI and the allocation of the preconfigured resources to sidelink communication might be provided to UE 108 and 110 through a second DCI. In another example, the allocation might be indicated through a combination of RRC signaling and DCI. Preconfiguring the allocations of the resources in this way is convenient because it enables each receiving node (gNB 106 and/or UE 110) to know whether a received transmission from UE 108 is a cellular transmission or sidelink transmission without an identifier being required in the transmission.

As well as preconfiguring the allocation of the resources, gNB 106 might dynamically switch, or adjust, the allocation of the periodic resources between cellular and sidelink communications. This resource allocation switching might be configured through RRC signaling and/or DCI. The gNB may perform this resource allocation switching in response to network conditions, for example in response to detecting that cellular network conditions have dropped below a threshold level. To take a particular example, consider that UE 108 intends to transmit data to UE 110 and is initially configured to allocate the transmission occasions within period n+1 to UL cellular transmissions (as in FIG. 6A). If gNB 106 detects that these UL transmissions fail, it may transmit a NACK to UE 108 and also allocate to UE 108 the resources within period 'n+2' to sidelink transmissions, to enable UE 108 to re-transmit data to UE 110 over the sidelink. Alternatively, the gNB might switch the allocation of resources so that resources in a period for UE 108 are allocated to SL transmissions, but resources in a subsequent period are allocated to cellular transmissions. This might be done if it's detected the UEs 108 and 110 move out of range for SL communications.

It can therefore be appreciated how the ability to allocate preconfigured resources to both cellular and sidelink transmissions can be beneficial for transmission reliability in cases where UEs 108 and 110 are located within the same cell.

The gNB 106 might additionally indicate any switch in resource allocation to UE 110. This enables UE 110 to know what type of transmission it will receive within a period. The switch in resource allocation might be provided to UE 110 through DCI, or for example as a bitmap indicating which periods or which occasions within a period are for cellular DL reception and SL reception.

In other examples, the allocation of periodic resources to the first and second sets of resources might be determined by UE 108. As explained above, in these cases the UE 108 still receives the assignment of the preconfigured resources from gNB 106 (e.g. through DCI and/or RRC). However, the allocation, or division, of those resources to cellular and sidelink communications is determined by the UE 108. Thus, in this case, gNB 106 knows a priori that each resource can be used for either cellular or sidelink communication. The determination might be made autonomously; that is, independently of gNB 106. It might be made dynamically, e.g. in response to cellular network conditions. UE 108 might for example detect that cellular transmissions are operating below a threshold performance level. UE 108 might detect this through gathered statistics or the use of Artificial Intelligence ("AI") and/or machine learning ("ML") based on received ACK/NACK feedback from gNB 106, channel reports etc.

For cases where the allocation of resources between cellular and sidelink communications is determined by the UE 108, the transmissions in those resources may include an identifier that identifies the transmission as either a cellular or sidelink transmission. This is because the receiving nodes do not know a priori whether a received transmission is cellular-based or SL-based. The use of an identifier can conveniently enable the receiving node to make this determination (and hence know whether it can discard the communication or not) without having to fully decode the communication. The identifier might take the form of a DMRS, with there being a different DMRS for cellular transmissions to sidelink transmissions. Alternatively, the identifier might take the form of control information, e.g. uplink control information ("UCI") for cellular transmissions and SCI for sidelink communications. It might take the form of an RNTI, for example a C-RNTI for cellular communications and an SL-RNTI for sidelink communications. The identifier could take the form of a single bit. Regardless of the type of identifier, it should be independent of the cellular and sidelink receiver so that each type of receiver can decode the identifier regardless of whether it's included within a cellular or sidelink transmission.

In some cases, the cellular communication in the first set of resources occurs over a different subcarrier spacing ("SCS") to the sidelink communication in the second set of resources. The communications in the first and second sets of resources might occur in different bandwidth parts ("BWPs"). They might occur over different component carriers ("CCs). Such features can enable a greater use of the frequency spectrum, reducing the likelihood of congestion, resource conflict, or possible interference.

In the examples described above the preconfigured resources have been periodic resources. It will be appreciated that the techniques herein are applicable to cases in which the preconfigured resources are non-periodic resources. Within that non-periodic pattern of resources, the wireless device 108 might perform cellular communication in a first set of one or more resources and sidelink communication in a second set of one of more resources. Thus, the non-periodic resources are usable for both cellular and sidelink communication. The allocation, or division, of the non-periodic resources between cellular and sidelink communication might be configured by the network node. It might for example be indicated through a bitmap indicating which resources are allocated to cellular transmissions and which resources are allocated to sidelink communications. Alternatively, the allocation or division of resources between cellular and sidelink communication might be determined by the wireless device, for example as described above.

Figure 8:
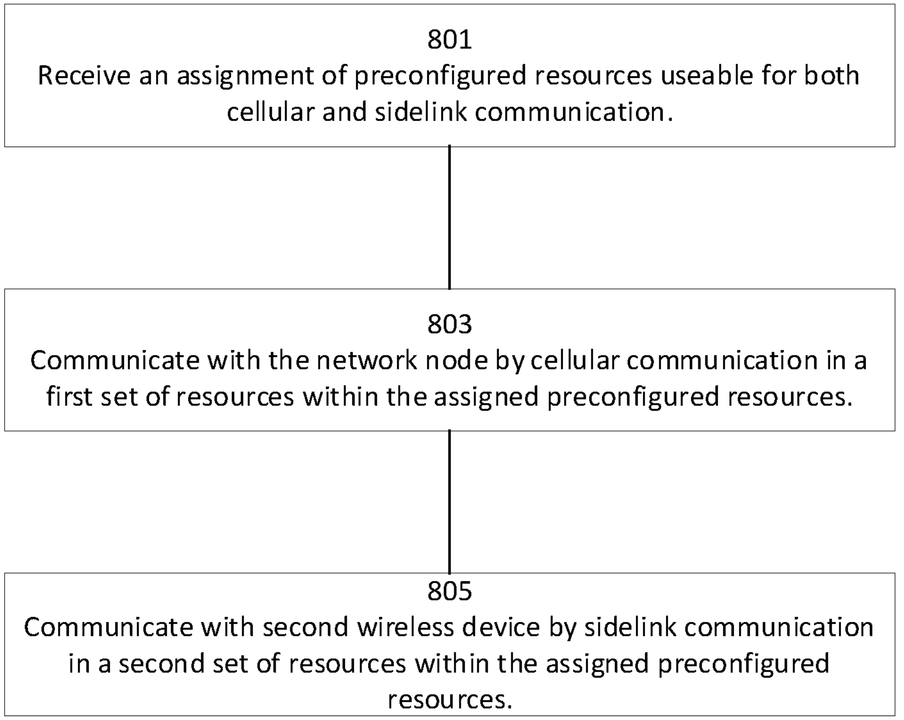
FIG. 8 is a flow diagram illustrating exemplary steps performed by a wireless device according to embodiments of the present disclosure.

FIG. 8 is a flowchart of steps performed by wireless device 108 summarizing the embodiments of the present disclosure.

At step 801, the wireless device 108 receives from the network node 106 an assignment of preconfigured resources that are usable for both cellular and sidelink communications. The preconfigured resources might be periodic or non-periodic resources. The resources might be time-domain resources. The communications may be transmissions or reception of transmissions. The allocation of the preconfigured resources to cellular and sidelink communications might be configured by the network node or determined by the wireless device.

At step 803, the wireless device 108 communicates with the network node 106 by cellular communication in a first set of resources within the assigned preconfigured resources, and at step 805 the wireless device communicates with a second wireless device 110 by sidelink communication in a second set of resources within the assigned preconfigured resources. Steps 803 and 805 do not necessarily occur in any temporal order.

Figure 9:
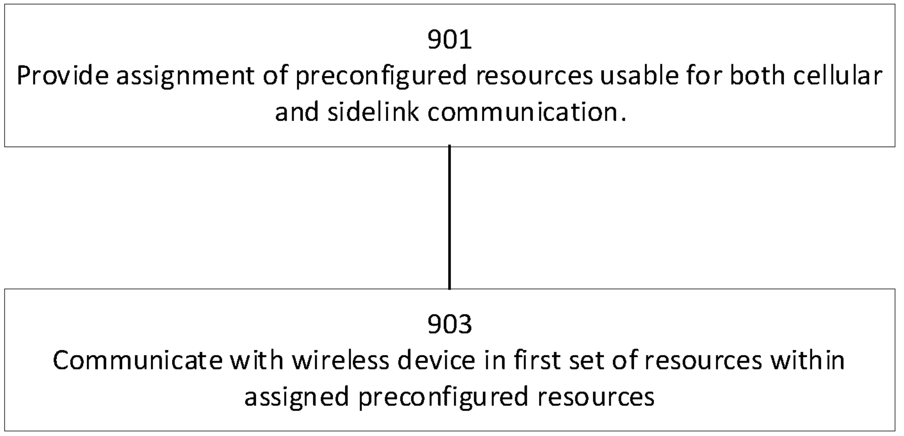
FIG. 9 is a flow diagram illustrating exemplary steps performed by a network node according to embodiments of the present disclosure.

FIG. 9 is a flowchart of steps performed by network node 106 summarizing the embodiments of the present disclosure.

At step 901, the network node 106 provides an assignment of preconfigured resources to wireless device 108 usable for both cellular and sidelink communications. The assignment might be provided through DCI. It might be provided through a single DCI. The assignment might be provided through RRC. The preconfigured resources might be periodic or non-periodic resources. The resources might be time-domain resources. The communications may be transmissions or reception of transmissions. The allocation of the preconfigured resources to cellular and sidelink communications might be configured by the network node or determined by the wireless device. In the former case, the method additionally comprises configuring the wireless device 108 with the allocation, or division, of the preconfigured resources to cellular and sidelink communications. That is, the method may comprise the network node 106 configuring the wireless device 108 with the allocation of the preconfigured resources to the first and second sets of resources.

At step 903 the network node 106 communicates with the wireless device 108 within the first set of resources of the preconfigured resources. The communication with wireless device 108 might take the form of DL transmissions to wireless device 108 or receiving UL transmissions from the wireless device 108.

The method may additionally comprise providing to the wireless device 108 and/or wireless device 110 an indication of a change in the allocation of the periodic resources between cellular and sidelink communications. The decision to change the allocation might be made by the network node 106 (in which case the indication of the change may be provided to both wireless devices) or the wireless device 108 (in which case the indication of the change may be provided to only the second wireless device 110).

The techniques discussed herein can provide several advantages. By enabling preconfigured resources to be allocated to both cellular and sidelink communications, the resources can be utilized in a way that's efficient and beneficial for the conditions experienced by the communication network or the requirements of the data being communicated. For example, allocating resources to both cellular and sidelink communications (e.g. within a single period, as illustrated in FIGS. 7A and 7B) can increase reliability through transmission diversity. This is because the cellular and sidelink communication links are distinct links. This may be particularly useful for transmitting data having a high reliability requirement, e.g. ultra-reliable low-latency communication ("URLLC") data. It also provides a convenient way to increase transmission diversity without having to provide additional network nodes within the cell and/or implement more expensive and complex equipment such as beamforming antenna arrays.

Allocating resources to both cellular and sidelink communications within a single period can also be used to increase data throughput and network capacity when different data is communicated over the cellular link and sidelink within the period.

The ability to allocate resources within one period to one type of communication and the resources within a subsequent period to the other type of communication (e.g. as in FIGS. 6A and 6B) can be useful for adapting to network conditions and decreasing latency. For example, sidelinks typically have reduced latency compared to cellular links. Therefore, if conditions allow—for example the wireless devices are within D2D range of each other—resources can be allocated to sidelink communications to reduce latency. Alternatively, resources can be allocated to sidelink resources if the cellular communication link suffers a drop in quality, e.g. the quality level drops below a threshold according to one or more measurement parameters. In other words, the periodic resources—at least within certain periods—can be prioritized for sidelink communications, which might increase reliability (if the quality of the cellular communication link is deteriorating) and/or improve latency.

The fact the preconfigured resources are usable for both cellular and sidelink communications, and that allocations can in some embodiments be switched, or are configurable, makes the resource allocation flexible and adaptive to network conditions and/or the type of data being communicated. Thus, the resources can be efficiently used in a variety of conditions, which is not possible in existing systems where preconfigured resources can only be used solely for cellular or solely for sidelink communications.

Figure 10:
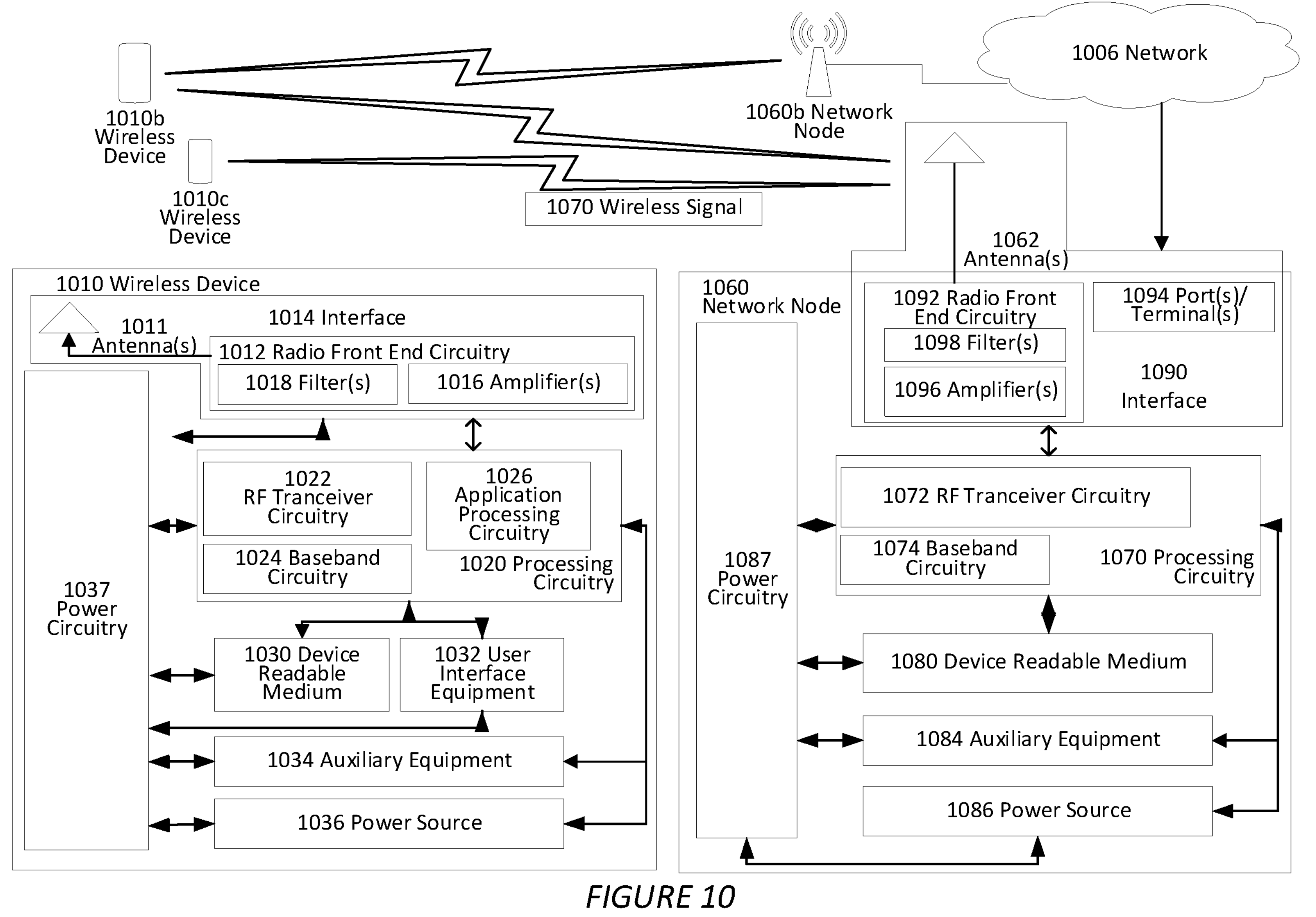
FIG. 10 is a block diagram of a wireless communication network according to some embodiments.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts network 1006, network nodes 1060 and 1060*b*, and Wireless devices 1010, 1010*b*, and 1010*c*. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. Network node 1060 may comprise a radio network node 16 as described above earlier hereinwith reference to FIGS. 2 to 6, or the gNB or ng-eNB as described in FIG. 1. Wireless device 1010 may comprise a wireless device 14 as described with reference to FIGS. 2 to 6 or the UE as described in FIG. 1 earlier herein. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and Wireless device 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc. and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or Wireless devices 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or Wireless devices via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being performed by a network node. Any information, data and/or signals may be received from a wireless device, another network node and/or any other network equipment. Similarly, antenna 1062, interface 1090, and/or processing circuitry 1070 may be configured to perform any transmitting operations described herein as being performed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source 1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 10 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, "wireless device" (WD) refers to a device capable, configured, arranged and/or operable to communicate wirelessly with network nodes and/or other wireless devices. Unless otherwise noted, the term WD "wireless device" may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a Wireless device may be configured to transmit and/or receive information without direct human interaction. For instance, a Wireless device may be designed to transmit information to a network on a predetermined schedule, when triggered by an internal or external event, or in response to requests from the network. Examples of a Wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc.

A Wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a Wireless device may represent a machine or other device that performs monitoring and/or measurements, and transmits the results of such monitoring and/or measurements to another Wireless device and/or a network node. The Wireless device may in this case be a machine-to-machine (M2M) device, which may in a 3GPP context be referred to as an MTC device. As one particular example, the Wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a Wireless device may represent a vehicle or other equipment that is capable of monitoring and/or reporting on its operational status or other functions associated with its operation. A Wireless device as described above may represent the endpoint of a wireless connection, in which case the device may be referred to as a wireless terminal. Furthermore, a Wireless device as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. The WD wireless device 1010 may include multiple sets of one or more of the illustrated components for different wireless technologies supported by Wireless device 1010, such as, for example, GSM, WCDMA, LTE, NR, WiFi, WiMAX, or Bluetooth wireless technologies, just to mention a few. These wireless technologies may be integrated into the same or different chips or set of chips as other components within Wireless device 1010.

Antenna 1011 may include one or more antennas or antenna arrays, configured to send and/or receive wireless signals, and is connected to interface 1014. In certain alternative embodiments, antenna 1011 may be separate from Wireless device 1010 and be connectable to Wireless device 1010 through an interface or port. Antenna 1011, interface 1014, and/or processing circuitry 1020 may be configured to perform any receiving or transmitting operations described herein as being performed by a Wireless device. Any information, data and/or signals may be received from a network node and/or another Wireless device. In some embodiments, radio front end circuitry and/or antenna 1011 may be considered an interface.

As illustrated, interface 1014 comprises radio front end circuitry 1012 and antenna 1011. Radio front end circuitry 1012 comprise one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, Wireless device 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or Wireless devices via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other Wireless device 1010 components, such as device readable medium 1030, Wireless device 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of Wireless device 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being performed by a Wireless device may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of Wireless device 1010, but are enjoyed by Wireless device 1010 as a whole, and/or by end users and the wireless network generally.

Processing circuitry 1020 may be configured to perform any determining, calculating, or similar operations (e.g., certain obtaining operations) described herein as being performed by a Wireless device. These operations, as performed by processing circuitry 1020, may include processing information obtained by processing circuitry 1020 by, for example, converting the obtained information into other information, comparing the obtained information or converted information to information stored by Wireless device 1010, and/or performing one or more operations based on the obtained information or converted information, and as a result of said processing making a determination.

Device readable medium 1030 may be operable to store a computer program, software, an application including one or more of logic, rules, code, tables, etc. and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with Wireless device 1010. Such interaction may be of many forms, such as visual, audial, tactile, etc. User interface equipment 1032 may be operable to produce output to the user and to allow the user to provide input to Wireless device 1010. The type of interaction may vary depending on the type of user interface equipment 1032 installed in Wireless device 1010. For example, if Wireless device 1010 is a smart phone, the interaction may be via a touch screen; if Wireless device 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into Wireless device 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from Wireless device 1010, and to allow processing circuitry 1020 to output information from Wireless device 1010. User interface equipment 1032 may include, for example, a speaker, a display, vibrating circuitry, a USB port, a headphone interface, or other output circuitry. Using one or more input and output interfaces, devices, and circuits, of user interface equipment 1032, Wireless device 1010 may communicate with end users and/or the wireless network, and allow them to benefit from the functionality described herein.

Auxiliary equipment 1034 is operable to provide more specific functionality which may not be generally performed by Wireless devices. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. The Wireless device 1010 may further comprise power circuitry 1037 for delivering power from power source 1036 to the various parts of Wireless device 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case Wireless device 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of Wireless device 1010 to which power is supplied.

Figure 11:
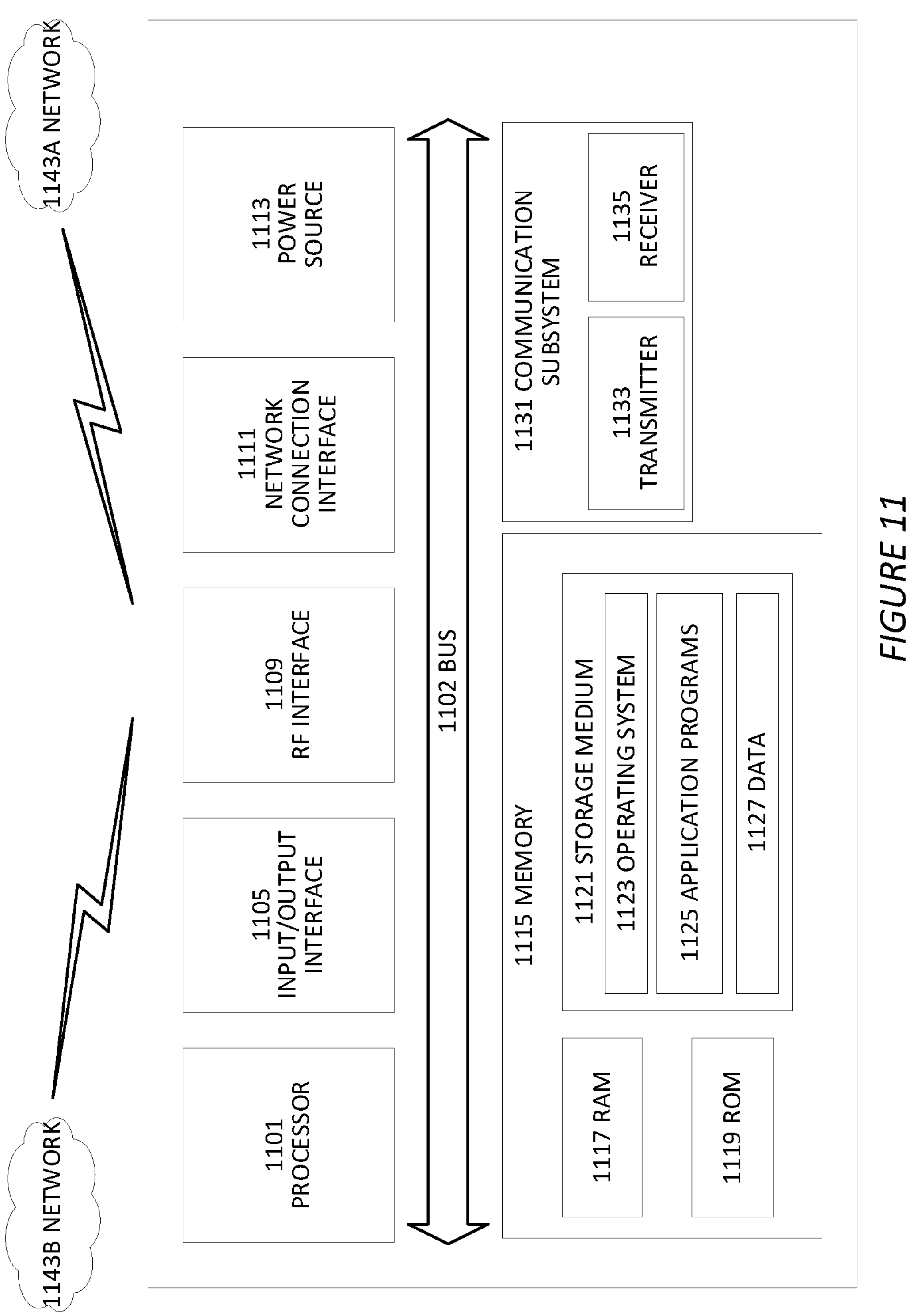
FIG. 11 is a block diagram of a user equipment according to some embodiments.

FIG. 11 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IoT UE, a machine type communication (MTC) UE, and/or an enhanced MTC (eMTC) UE. UE 1100, as illustrated in FIG. 11, is one example of a wireless device configured for communication in accordance with one or more communication standards promulgated by the 3rd Generation Partnership Project (3GPP), such as 3GPP's GSM, UMTS, LTE, and/or 5G standards. As mentioned previously, the term wireless device and UE may be used interchangeable. Accordingly, although FIG. 11 is a UE, the components discussed herein are equally applicable to a wireless device, and vice-versa.

In FIG. 11, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 11, or only a subset of the components. The level of integration between the components may vary from one UE to another UE. Further, certain UEs may contain multiple instances of a component, such as multiple processors, memories, transceivers, transmitters, receivers, etc.

In FIG. 11, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 11, RF interface 1109 may be configured to provide a communication interface to RF components such as a transmitter, a receiver, and an antenna. Network connection interface 1111 may be configured to provide a communication interface to network **1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111** may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 11, processing circuitry 1101 may be configured to communicate with network **1143*b* using communication subsystem 1131. Network 1143*a* and network 1143*b* may be the same network or networks or different network or networks. Communication subsystem 1131 may be configured to include one or more transceivers used to communicate with network 1143*b*. For example, communication subsystem 1131 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135** of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network **1143*b* may encompass wired and/or wireless networks such as a local-area network (LAN), a wide-area network (WAN), a computer network, a wireless network, a telecommunications network, another like network or any combination thereof. For example, network 1143***b* may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 12:
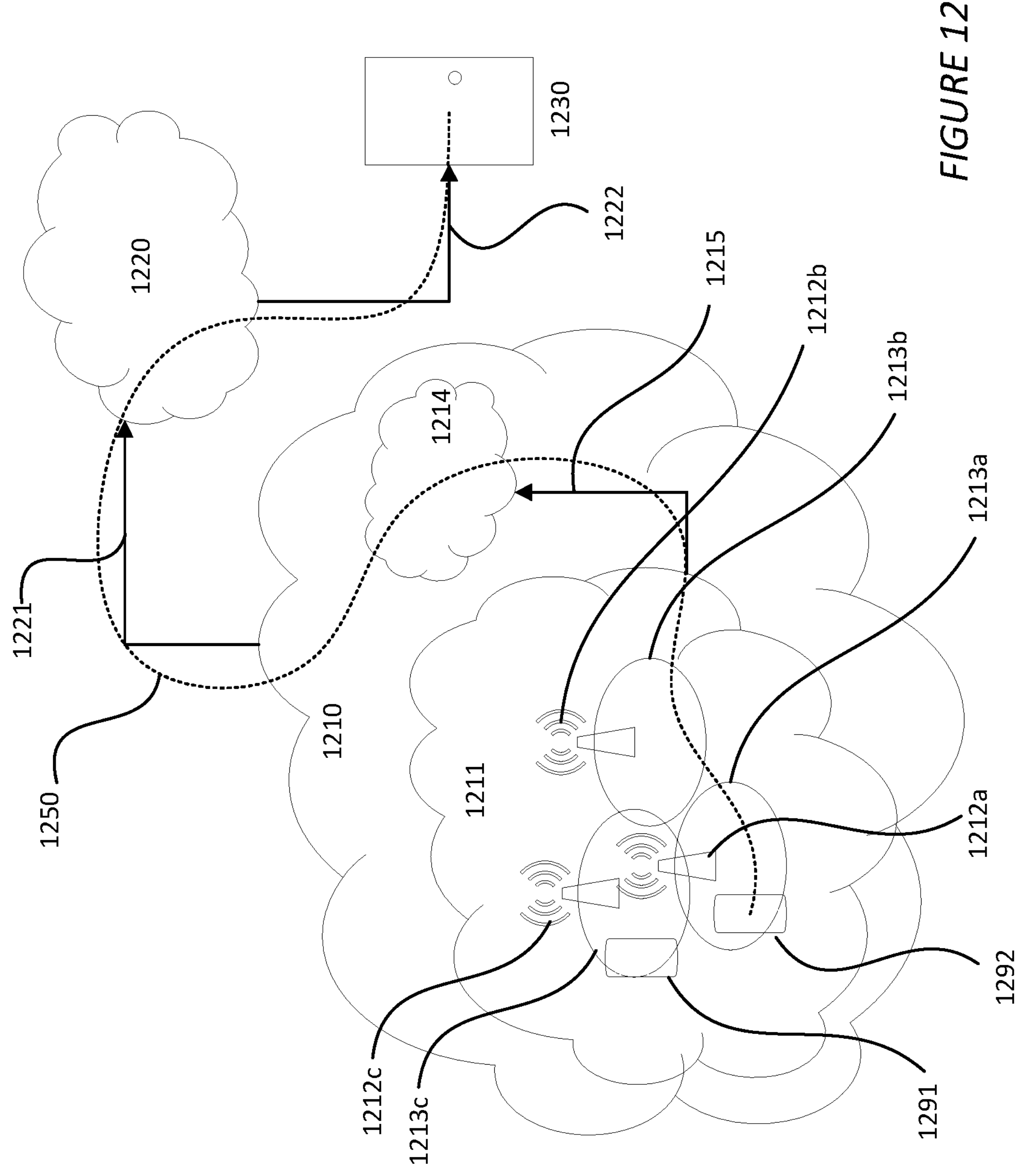
FIG. 12 is a block diagram of a communication network with a host computer according to some embodiments.

With reference to FIG. 12, in accordance with an embodiment, a communication system includes telecommunication network 1210, such as a 3GPP-type cellular network, which comprises access network 1211, such as a radio access network, and core network 1214. Access network 1211 comprises a plurality of base stations 1212*a*, 1212*b*, 1212*c*, such as NB s, eNBs, gNBs or other types of wireless access points, each defining a corresponding coverage area 1213*a*, 1213*b*, 1213*c*. Each base station 1212*a*, 1212*b*, 1212*c* is connectable to core network 1214 over a wired or wireless connection 1215. A first UE 1291 located in coverage area 1213*c* is configured to wirelessly connect to, or be paged by, the corresponding base station 1212*c*. A second UE 1292 in coverage area 1213*a* is wirelessly connectable to the corresponding base station 1212*a*. While a plurality of UEs 1291, 1292 are illustrated in this example, the disclosed embodiments are equally applicable to a situation where a sole UE is in the coverage area or where a sole UE is connecting to the corresponding base station 1212.

Telecommunication network 1210 is itself connected to host computer 1230, which may be embodied in the hardware and/or software of a standalone server, a cloud-implemented server, a distributed server or as processing resources in a server farm. Host computer 1230 may be under the ownership or control of a service provider or may be operated by the service provider or on behalf of the service provider. Connections 1221 and 1222 between telecommunication network 1210 and host computer 1230 may extend directly from core network 1214 to host computer 1230 or may go via an optional intermediate network 1220. Intermediate network 1220 may be one of, or a combination of more than one of, a public, private or hosted network; intermediate network 1220, if any, may be a backbone network or the Internet; in particular, intermediate network 1220 may comprise two or more sub-networks (not shown).

The communication system of FIG. 12 as a whole enables connectivity between the connected UEs 1291, 1292 and host computer 1230. The connectivity may be described as an over-the-top (OTT) connection 1250. Host computer 1230 and the connected UEs 1291, 1292 are configured to communicate data and/or signaling via OTT connection 1250, using access network 1211, core network 1214, any intermediate network 1220 and possible further infrastructure (not shown) as intermediaries. OTT connection 1250 may be transparent in the sense that the participating communication devices through which OTT connection 1250 passes are unaware of routing of uplink and downlink communications. For example, base station 1212 may not or need not be informed about the past routing of an incoming downlink communication with data originating from host computer 1230 to be forwarded (e.g., handed over) to a connected UE 1291. Similarly, base station 1212 need not be aware of the future routing of an outgoing uplink communication originating from the UE 1291 towards the host computer 1230.

Example implementations, in accordance with an embodiment, of the UE, base station and host computer discussed in the preceding paragraphs will now be described with reference to FIG. 13. In communication system 1300, host computer 1310 comprises hardware 1315 including communication interface 1316 configured to set up and maintain a wired or wireless connection with an interface of a different communication device of communication system 1300. Host computer 1310 further comprises processing circuitry 1318, which may have storage and/or processing capabilities. In particular, processing circuitry 1318 may comprise one or more programmable processors, application-specific integrated circuits, field programmable gate arrays or combinations of these (not shown) adapted to execute instructions. Host computer 1310 further comprises software 1311, which is stored in or accessible by host computer 1310 and executable by processing circuitry 1318. Software 1311 includes host application 1312. Host application 1312 may be operable to provide a service to a remote user, such as UE 1330 connecting via OTT connection 1350 terminating at UE 1330 and host computer 1310. In providing the service to the remote user, host application 1312 may provide user data which is transmitted using OTT connection 1350.

Communication system 1300 further includes base station 1320 provided in a telecommunication system and comprising hardware 1325 enabling it to communicate with host computer 1310 and with UE 1330. Hardware 1325 may include communication interface 1326 for setting up and maintaining a wired or wireless connection with an interface of a different communication device of communication system 1300, as well as radio interface 1327 for setting up and maintaining at least wireless connection 1370 with UE 1330 located in a coverage area (not shown in FIG. 13) served by base station 1320. Communication interface 1326 may be configured to facilitate connection 1360 to host computer 1310. Connection 1360 may be direct or it may pass through a core network (not shown in FIG. 13) of the telecommunication system and/or through one or more intermediate networks outside the telecommunication system. In the embodiment shown, hardware 1325 of base station 1320 further includes processing circuitry 1328, which may comprise one or more programmable processors, application-specific integrated circuits, field programmable gate arrays or combinations of these (not shown) adapted to execute instructions. Base station 1320 further has software 1321 stored internally or accessible via an external connection.

Communication system 1300 further includes UE 1330 already referred to. Its hardware 1335 may include radio interface 1337 configured to set up and maintain wireless connection 1370 with a base station serving a coverage area in which UE 1330 is currently located. Hardware 1335 of UE 1330 further includes processing circuitry 1338, which may comprise one or more programmable processors, application-specific integrated circuits, field programmable gate arrays or combinations of these (not shown) adapted to execute instructions. UE 1330 further comprises software 1331, which is stored in or accessible by UE 1330 and executable by processing circuitry 1338. Software 1331 includes client application 1332. Client application 1332 may be operable to provide a service to a human or non-human user via UE 1330, with the support of host computer 1310. In host computer 1310, an executing host application 1312 may communicate with the executing client application 1332 via OTT connection 1350 terminating at UE 1330 and host computer 1310. In providing the service to the user, client application 1332 may receive request data from host application 1312 and provide user data in response to the request data. OTT connection 1350 may transfer both the request data and the user data. Client application 1332 may interact with the user to generate the user data that it provides.

Figure 13:
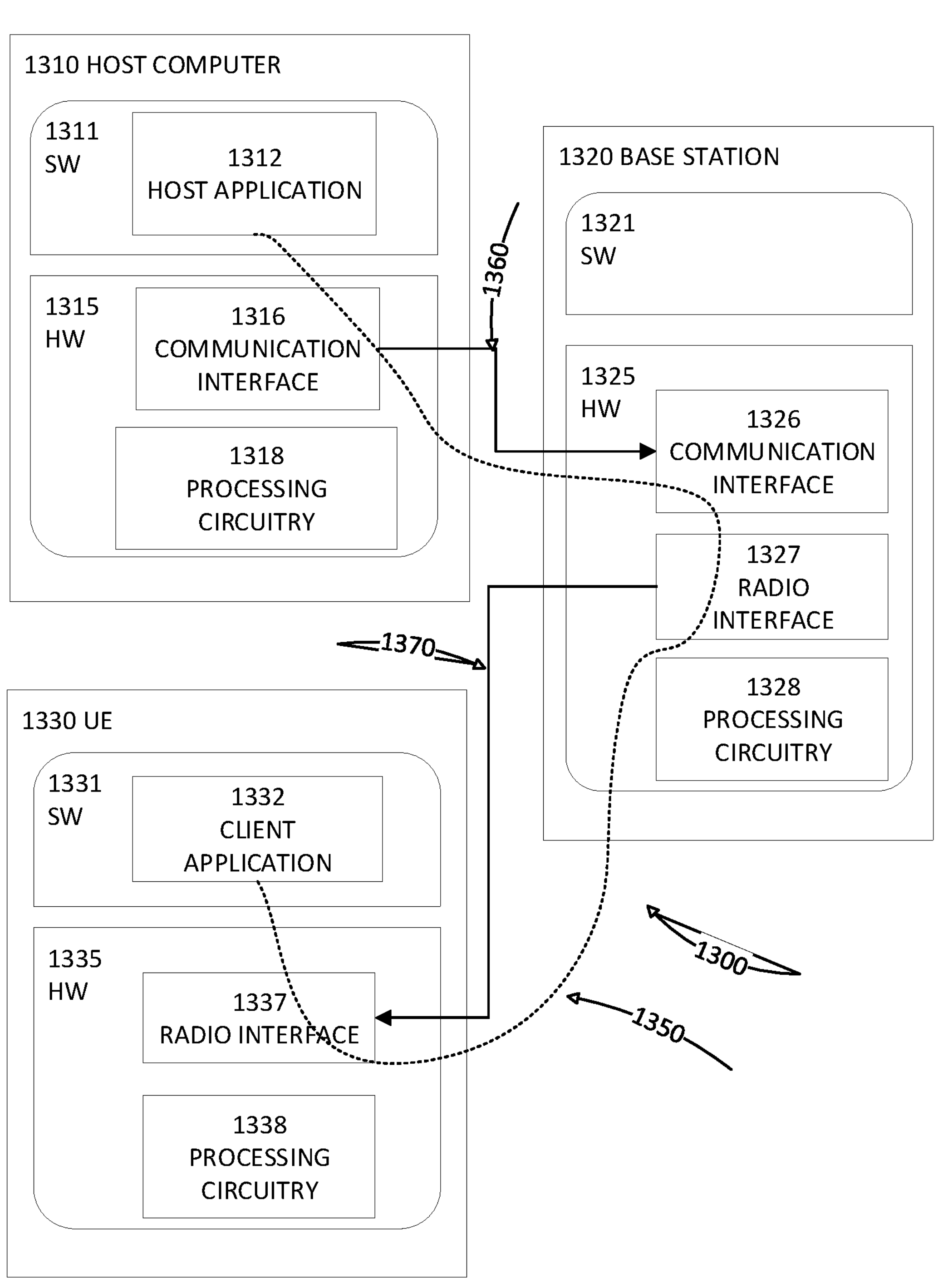
FIG. 13 is a block diagram of a host computer according to some embodiments.

It is noted that host computer 1310, base station 1320 and UE 1330 illustrated in FIG. 13 may be similar or identical to host computer 1230, one of base stations 1212*a*, 1212*b*, 1212*c* and one of UEs 1291, 1292 of FIG. 12, respectively. This is to say, the inner workings of these entities may be as shown in FIG. 13 and independently, the surrounding network topology may be that of FIG. 12.

In FIG. 13, OTT connection 1350 has been drawn abstractly to illustrate the communication between host computer 1310 and UE 1330 via base station 1320, without explicit reference to any intermediary devices and the precise routing of messages via these devices. Network infrastructure may determine the routing, which it may be configured to hide from UE 1330 or from the service provider operating host computer 1310, or both. While OTT connection 1350 is active, the network infrastructure may further take decisions by which it dynamically changes the routing (e.g., on the basis of load balancing consideration or reconfiguration of the network).

Wireless connection 1370 between UE 1330 and base station 1320 is in accordance with the teachings of the embodiments described throughout this disclosure. One or more of the various embodiments improve the performance of OTT services provided to UE 1330 using OTT connection 1350, in which wireless connection 1370 forms the last segment. For example, the teachings of these embodiments may improve the latency provide greater transmission diversity and thereby provide benefits such as improved reliability of the OTT connection.

A measurement procedure may be provided for the purpose of monitoring data rate, latency, and other factors on which the one or more embodiments improve. There may further be an optional network functionality for reconfiguring OTT connection 1350 between host computer 1310 and UE 1330, in response to variations in the measurement results. The measurement procedure and/or the network functionality for reconfiguring OTT connection 1350 may be implemented in software 1311 and hardware 1315 of host computer 1310 or in software 1331 and hardware 1335 of UE 1330, or both. In embodiments, sensors (not shown) may be deployed in or in association with communication devices through which OTT connection 1350 passes; the sensors may participate in the measurement procedure by supplying values of the monitored quantities exemplified above, or supplying values of other physical quantities from which software 1311, 1331 may compute or estimate the monitored quantities. The reconfiguring of OTT connection 1350 may include message format, retransmission settings, preferred routing etc.; the reconfiguring need not affect base station 1320, and it may be unknown or imperceptible to base station 1320. Such procedures and functionalities may be known and practiced in the art. In certain embodiments, measurements may involve proprietary UE signaling facilitating host computer 1310's measurements of throughput, propagation times, latency and the like. The measurements may be implemented in that software 1311 and 1331 causes messages to be transmitted, in particular empty or 'dummy' messages, using OTT connection 1350 while it monitors propagation times, errors etc.

Figure 14:
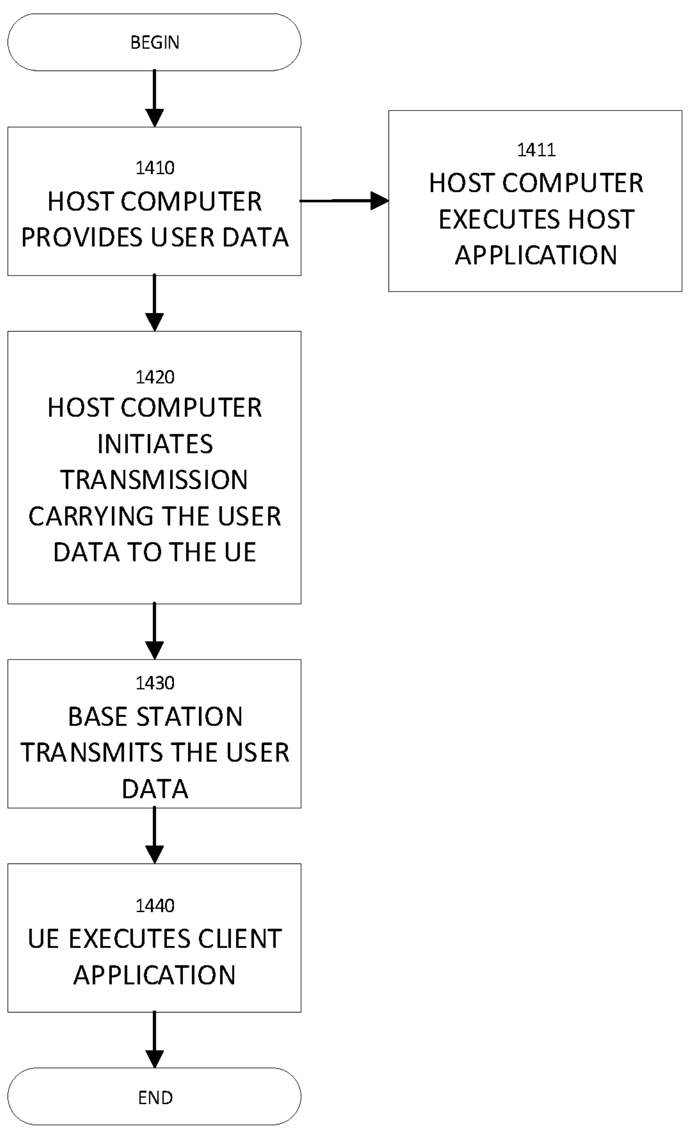
FIG. 14 is a flowchart illustrating a method implemented in a communication system, in accordance with one embodiment.

FIG. 14 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 14 will be included in this section. In step 1410, the host computer provides user data. In substep 1411 (which may be optional) of step 1410, the host computer provides the user data by executing a host application. In step 1420, the host computer initiates a transmission carrying the user data to the UE. In step 1430 (which may be optional), the base station transmits to the UE the user data which was carried in the transmission that the host computer initiated, in accordance with the teachings of the embodiments described throughout this disclosure. In step 1440 (which may also be optional), the UE executes a client application associated with the host application executed by the host computer.

Figure 15:
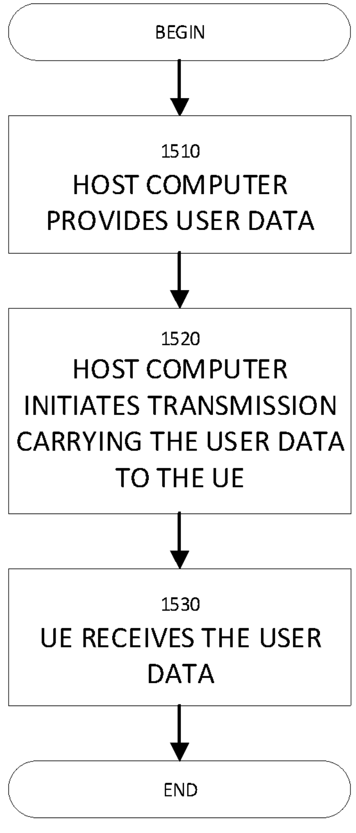
FIG. 15 is a flowchart illustrating a method implemented in a communication system, in accordance with one embodiment.

FIG. 15 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 15 will be included in this section. In step 1510 of the method, the host computer provides user data. In an optional sub-step (not shown) the host computer provides the user data by executing a host application. In step 1520, the host computer initiates a transmission carrying the user data to the UE. The transmission may pass via the base station, in accordance with the teachings of the embodiments described throughout this disclosure. In step 1530 (which may be optional), the UE receives the user data carried in the transmission.

Figure 16:
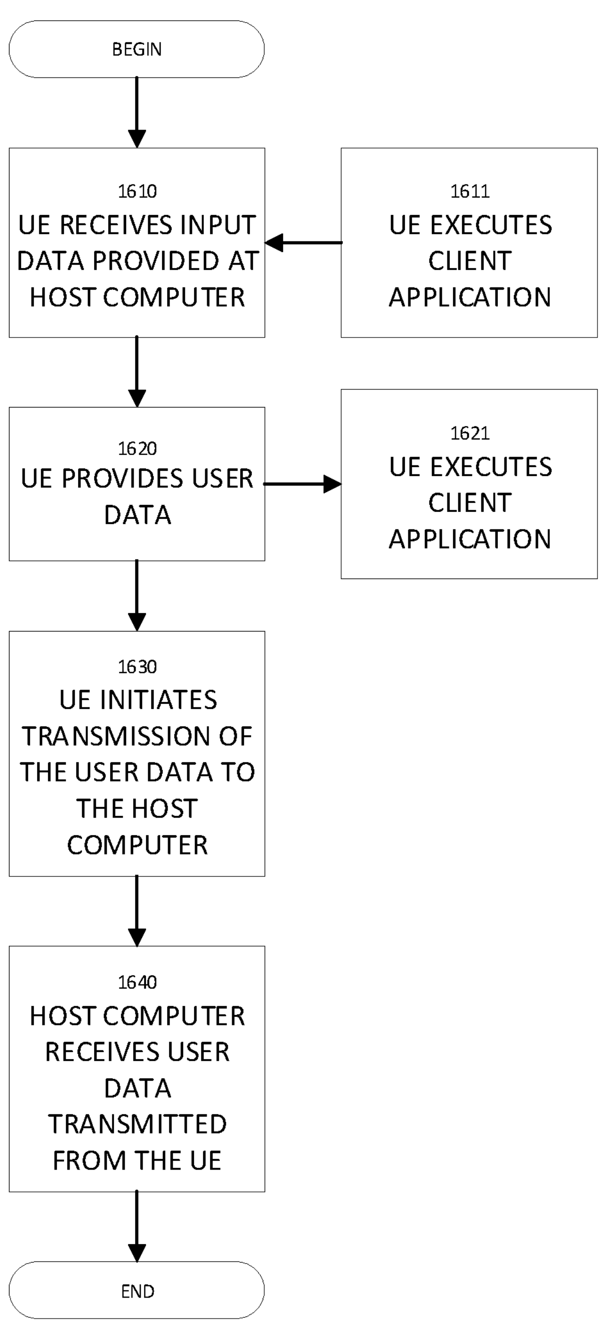
FIG. 16 is a flowchart illustrating a method implemented in a communication system, in accordance with one embodiment.

FIG. 16 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 16 will be included in this section. In step 1610 (which may be optional), the UE receives input data provided by the host computer. Additionally, or alternatively, in step 1620, the UE provides user data. In sub-step 1621 (which may be optional) of step 1620, the UE provides the user data by executing a client application. In substep 1611 (which may be optional) of step 1610, the UE executes a client application which provides the user data in reaction to the received input data provided by the host computer. In providing the user data, the executed client application may further consider user input received from the user. Regardless of the specific manner in which the user data was provided, the UE initiates, in sub-step 1630 (which may be optional), transmission of the user data to the host computer.

In step 1640 of the method, the host computer receives the user data transmitted from the UE, in accordance with the teachings of the embodiments described throughout this disclosure.

Figure 17:
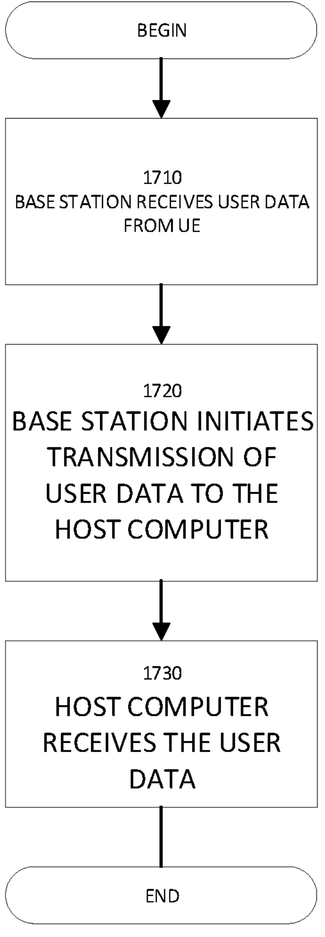
FIG. 17 is a flowchart illustrating a method implemented in a communication system, in accordance with one embodiment.

FIG. 17 is a flowchart illustrating a method implemented in a communication system, in accordance with one embodiment. The communication system includes a host computer, a base station and a UE which may be those described with reference to FIGS. 12 and 13. For simplicity of the present disclosure, only drawing references to FIG. 17 will be included in this section. In step 1710 (which may be optional), in accordance with the teachings of the embodiments described throughout this disclosure, the base station receives user data from the UE. In step 1720 (which may be optional), the base station initiates transmission of the received user data to the host computer. In step 1730 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the foregoing descriptions.

Further, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein.

The invention claimed is:

1. A method performed by a wireless device, comprising:

receiving, from a network node, an assignment of preconfigured resources useable by the wireless device for both cellular and sidelink communication, wherein the preconfigured resources are associated with an identifier that is independent of a type of a receiver for cellular communication and a type of a receiver for sidelink communication;

communicating with the network node by cellular communication in a first set of resources within the assigned preconfigured resources; and communicating with a second wireless device by sidelink communication in a second set of resources within the assigned preconfigured resources, wherein assigned preconfigured resources have a configured periodicity and span a group of one or more transmission occasions in each of a plurality of periods, wherein the first set of resources comprise the transmission occasions within a period of the preconfigured resources and the second set of resources comprise the transmission occasions within a different period of the preconfigured resources.

2. The method of claim 1, wherein the preconfigured resources are periodic resources.

3. The method of claim 1, wherein the first set of resources comprise one or more transmission occasions within a period, and the second set of resources comprise one or more different transmission occasions within the same period.

4. The method of claim 3, wherein the cellular communication in the one or more transmission occasions within the period and the sidelink communication in the one or more different transmission occasions within that same period are part of a single hybrid automatic repeat request, HARQ, process.

5. The method of claim 3, wherein the cellular communication in the one or more transmission occasions within the period and the sidelink communication in the one or more different transmission occasions within that same period are for the same data.

6. The method of claim 5, wherein the cellular communication in the one or more transmission occasions within the period and the sidelink communication in the one or more different transmission occasions within that same period are for the same packet data convergence protocol, PDCP, packet.

7. The method of claim 3, wherein the cellular communication in the one or more transmission occasions within the period and the sidelink communication in the one or more different transmission occasions within that same period are for the different data.

8. The method of claim 3, wherein the cellular communication in the one or more transmission occasions within the period and the sidelink communication in the one or more different transmission occasions within that same period are part of different HARQ processes.

9. The method of claim 3, wherein the cellular communication in the one or more transmission occasions within the period and the sidelink communication in the one or more different transmission occasions within that same period are targeted to different wireless devices.

10. The method of claim 1, wherein receiving the assignment of preconfigured resources comprises receiving an indication of the first set of resources for cellular communication and the second set of resources for sidelink communication.

11. The method of claim 10, wherein the indication of the first and second set of resources is received via: (i) radio resource control, RRC, signalling; (ii) downlink control information, DCI; or (iii) a combination of RRC and DCI.

12. The method of claim 10, comprising receiving a first indication indicating the first set of resources and a second indication indicating the second set of resources.

13. The method of claim 12, wherein the second indication is received after cellular communication in the first set of resources drops below a threshold quality level.

14. The method claim 1, wherein the communication with the network node by cellular communication in the first set of resources occurs over a different subcarrier spacing, SCS, to the communication with the second wireless device by sidelink communication in the second set of resources.

15. The method of claim 1, wherein the communication with the network node by cellular communication in the first set of resources occurs within a different bandwidth part, BWP, to the communication with the second wireless device by sidelink communication in the second set of resources.

16. The method of claim 1, wherein the communication with the network node by cellular communication in the first set of resources occurs over a different component carrier, CC, to the communication with the second wireless device by sidelink communication in the second set of resources.

17. A wireless device comprising transceiver circuitry and processing circuitry, the processing circuitry configured to cause the wireless device to:

receive, from a network node via the transceiver circuitry, an assignment of preconfigured resources useable for both cellular and sidelink communication, wherein the preconfigured resources are associated with an identifier that is independent of a type of a receiver for cellular communication and a type of a receiver for sidelink communication;

communicate with the network node by cellular communication via the transceiver circuitry in a first set of resources within the assigned preconfigured resources; and communicate with a second wireless device by sidelink communication via the transceiver circuitry in a second set of resources within the assigned preconfigured resources, wherein assigned preconfigured resources have a configured periodicity and span a group of one or more transmission occasions in each of a plurality of periods, wherein the first set of resources comprise the transmission occasions within a period of the preconfigured resources and the second set of resources comprise the transmission occasions within a different period of the preconfigured resources.

18. A non-transitory computer-readable storage medium storing instructions that, when executed by processing circuitry of a wireless device, causes the wireless device to perform a method comprising:

receiving, from a network node, an assignment of preconfigured resources useable by the wireless device for both cellular and sidelink communication, wherein the preconfigured resources are associated with an identifier that is independent of a type of a receiver for cellular communication and a type of a receiver for sidelink communication;

communicating with the network node by cellular communication in a first set of resources within the assigned preconfigured resources; and communicating with a second wireless device by sidelink communication in a second set of resources within the assigned preconfigured resources, wherein assigned preconfigured resources have a configured periodicity and span a group of one or more transmission occasions in each of a plurality of periods, wherein the first set of resources comprise the transmission occasions within a period of the preconfigured resources and the second set of resources comprise the transmission occasions within a different period of the preconfigured resources.

* * * * *